United States Patent
Shipman, Jr. et al.

(10) Patent No.: US 12,068,625 B1
(45) Date of Patent: Aug. 20, 2024

(54) STORAGE AND CHARGING SYSTEM WITH DRAINAGE FOR TABLETS

(71) Applicant: Tech Friends, Inc., Jonesboro, AR (US)

(72) Inventors: Bobby L Shipman, Jr., Jonesboro, AR (US); Bryan D. Taylor, Bono, AR (US); Bobby L. Shipman, III, Jonesboro, AR (US); Joshua L. Parrish, Paragould, AR (US); Joseph Michael Schaefer, III, Jonesboro, AR (US); Mark Haney, Jonesboro, AR (US)

(73) Assignee: TECH FRIENDS, INC., Jonesboro, AR (US)

( * ) Notice: Subject to any disclaimer, the term of this patent is extended or adjusted under 35 U.S.C. 154(b) by 765 days.

(21) Appl. No.: 17/170,144

(22) Filed: Feb. 8, 2021

Related U.S. Application Data

(63) Continuation-in-part of application No. 17/125,228, filed on Dec. 17, 2020, now Pat. No. 11,591,159, which is a continuation-in-part of application No. 16/897,105, filed on Jun. 9, 2020, which is a continuation-in-part of application No. 16/033,045, filed on Jul. 11, 2018, now Pat. No. 10,678,302, which is a continuation-in-part of application No. 15/136,604, filed on Apr. 22, 2016, now Pat. No. 10,225,734, which is a continuation-in-part of
(Continued)

(51) Int. Cl.
*H02J 7/00* (2006.01)
*B65G 1/137* (2006.01)
*G06F 21/32* (2013.01)
*G06F 8/65* (2018.01)
*G06Q 50/06* (2012.01)

(52) U.S. Cl.
CPC .......... *H02J 7/0044* (2013.01); *B65G 1/1371* (2013.01); *G06F 21/32* (2013.01); *H02J 7/00045* (2020.01); *H02J 7/0045* (2013.01); *G06F 8/65* (2013.01); *G06Q 50/06* (2013.01); *H02J 7/0047* (2013.01)

(58) Field of Classification Search
USPC .......................................................... 320/114
See application file for complete search history.

(56) References Cited

U.S. PATENT DOCUMENTS

| | | | |
|---|---|---|---|
| 6,265,845 B1 * | 7/2001 | Bo .................. | H02J 7/0044 320/113 |
| 7,642,744 B2 * | 1/2010 | Zedell, Jr. ............ | H02J 7/0045 320/112 |

(Continued)

OTHER PUBLICATIONS

JP2009183118 Machine Translation (Year: 2009).*

*Primary Examiner* — Samuel Berhanu
(74) *Attorney, Agent, or Firm* — Schrantz Law Firm, PLLC; Stephen D. Schrantz

(57) ABSTRACT

A charging and storage system provides a support on which the electronic device, such as a tablet is stored and charged within a housing. The support angles downward such that the support is not level. The tablet is stored on the support not level to allow for any liquids to drain away from the tablet. The charger and support are secured within a removable charging unit that secures to the housing. Removal of the charging unit removes the support, the charger, and a lock that secures the tablet within the charging unit.

10 Claims, 17 Drawing Sheets

Related U.S. Application Data application No. 14/923,271, filed on Oct. 26, 2015, now Pat. No. 10,256,645, which is a continuation-in-part of application No. 14/869,592, filed on Sep. 29, 2015, now Pat. No. 9,917,455.

(56) References Cited

U.S. PATENT DOCUMENTS

| | | | | |
|---|---|---|---|---|
| 8,436,576 B2* | 5/2013 | Toya | ............ | H01M 50/262 320/108 |
| 2004/0257037 A1* | 12/2004 | Hartung | ............ | H01M 50/296 320/114 |
| 2006/0028178 A1* | 2/2006 | Hobbs | ............ | B60L 8/003 320/128 |
| 2008/0303481 A1* | 12/2008 | Silverbrook | ............ | B41J 29/393 320/115 |
| 2010/0102777 A1* | 4/2010 | Sa | ............ | G06F 1/1632 320/115 |
| 2012/0104995 A1* | 5/2012 | Woo | ............ | H02J 7/0044 320/107 |

* cited by examiner

STORAGE AND CHARGING SYSTEM WITH DRAINAGE FOR TABLETS

CROSS-REFERENCE TO RELATED APPLICATIONS

This application claims priority to and is a continuation in part of U.S. patent application Ser. No. 17/125,228 entitled "STORAGE AND CHARGING SYSTEM FOR DISPENSING TABLETS" that was filed on Dec. 17, 2020 that is a continuation in part of U.S. patent application Ser. No. 16/897,105 entitled "SECURED CHARGING SYSTEM FOR ELECTRONIC DEVICES" that was filed on Jun. 9, 2020 that is a continuation in part of U.S. patent application Ser. No. 16/033,045 entitled "SECURED STORAGE FOR ELECTRONIC DEVICES" that was filed on Jul. 11, 2018 that issued as U.S. Pat. No. 10,678,302 on Jun. 9, 2020, that is a continuation in part of U.S. patent application Ser. No. 15/136,604 entitled "SECURED STORAGE FOR ELECTRONIC DEVICES" that was filed on Apr. 22, 2016 that issued as U.S. Pat. No. 10,225,734 on Mar. 5, 2019, which is a continuation in part of U.S. patent application Ser. No. 14/923,271 entitled "Protective Housing" that was filed on Oct. 26, 2015 that issued as U.S. Pat. No. 10,256,645 on Apr. 9, 2019 which is a continuation in part of U.S. patent application Ser. No. 14/869,592 entitled "Charging Unit and System" that was filed on Sep. 29, 2015 that issued as U.S. Pat. No. 9,917,455 on Mar. 13, 2018, which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

In large organizations such as businesses, schools, hospitals, nursing homes, and jails, it is becoming increasingly common to have a significant number of mobile electronic devices to be charged on a regular basis. Current art for charging systems provides for basic charging but not comprehensive administration and control of mobile electronic charging throughout the organization. The present invention provides for large scale control of mobile device charging not possible with current art.

The present invention relates to a security system for charging and tracking tablets, smart phones, mobile computing devices, mobile electronic devices, and other electronic devices. The present invention provides a housing for storing and charging the devices within the housing. The housing secures the devices within the housing to limit access of the devices within the housing.

The housing provides safeguards that divert fluid and other debris away from the internal components within the housing. These safeguards limit exposure of power sources, chargers, and the electronic devices to liquids and other debris. The safeguards direct fluids away from these internal components to protect the components.

The housing provides chargers at charging locations within the device. The devices are stored at the charging locations within the housing. A lock secures the devices within the housing to limit access to the devices stored within the housing.

The storage and charging system allow remote control and management of the charging activity and mobile electronic device. The secure charging system may also be implemented with an identification system for the electronic device. In another embodiment, the secure charging system may securely store the electronic device to prevent unauthorized access to the device.

The secure charging system provides a method of charging the electronic device and a method of communication for remote administration. In one embodiment, the secure charging system may be implemented with communication capabilities to a central server and respond to commands from the central server. In another embodiment, the secure charging station may be implemented with peer-to-peer communications between charging stations.

If the user is granted access to a device, the lock releases the device for removal of the device from the housing. The user may then remove the device from the housing through the housing aperture. To secure the device upon insertion, a lock within the housing secures the device within the housing.

In some embodiments, the secure charging system may accept commands and utilize a central server to coordinate charging activities across multiple chargers which are physically separated from one another. In one embodiment, the secure charging system could disable charging for one or more electronic devices based on a remote command. In another embodiment, the secure charging system could report all electronic devices currently being charged.

In one embodiment, the secure charging system may be implemented with an identification system to identify electronic devices attempting to charge. In this embodiment, charging could be enabled or disabled based on the identity of the electronic device and the rules established by administrative personnel. In some embodiments, the secure charging system reports electronic device identity and charging status to a central server. In some embodiments, the charging system may bill or track electricity usage based upon information collected and/or reported by the secure charging system. In other embodiments, the secure charging system may send alerts if an electronic device has not been returned to a charger within a specified amount of time.

The server of one embodiment tracks usage of the devices. The server tracks the devices that are checked out and the devices that have been returned. The server generates reports identifying the status of the devices. Such statuses include but are not limited to devices within the housing, devices out of the housing, devices in the housing not charging, devices charging in the housing, and updates to the device. The server generates reports identifying the status of the devices and the date and the time of the status of the device.

In some embodiments, the secure charger may be equipped with cameras to identify persons retrieving mobile electronic devices from the secure charger. In some embodiments, cameras may take pictures of returned mobile electronic devices for damage assessment and transmit the pictures to a central server for evaluation.

In some embodiments, a touchscreen for entry is attached to the secure charger for entry of user authentication information. In other embodiments, the charger integrates a biometric device such as a camera, microphone, fingerprint reader, or the like, for authentication.

The present invention also cleans, sanitizes, and/or disinfects the mobile computing device, such as the tablets, when the mobile computing device is placed within the secure charger. The housing applies a sanitizing spray, such as a disinfectant to the device(s). In another embodiment, a sanitizing light, such as a UV light, shines on the devices to disinfect each device.

II. Description of the Known Art

Certain problems exist with the known art. Known charging systems do not store devices within a housing that directs fluids and other debris away from the devices and the internal components within the housing. Such safeguards within the housing limit damage to the internal components and the mobile devices within the housing.

Known charging systems provide unfettered and unmonitored access to charging services after an electronic device is physically connected to the charger. Known charging systems do not allow remote management of chargers by administrative personnel. Known charging systems do not allow multiple chargers which are physically separated to act in unison as a single charging system.

Known charging systems for electronic devices do not allow security rules to be enacted to prevent unauthorized charging of devices. Known charging systems do not allow a central server to maintain charging rules which can automatically enable or disable charging to specific electronic devices or specific physical charging connections. Known charging systems cannot aggregate data into an analytical engine to determine costs or usage across multiple distributed chargers.

Known charging systems for electronic devices do not monitor when devices are charging or stop charging. Known charging systems do not report to a central server for tracking usage or billing activities. Known charging systems for electronic devices do not monitor the physical condition of the electronic device or assess it for damage while using the charging system.

Known charging systems for electronic devices do not disable the electronic device if the electronic device is not returned to a specified charger within a defined period of time. Known charging systems do not send alerts to administrative personnel when an electronic device has not been returned to a charger within a defined period of time.

Known charging systems for electronic devices do not take pictures of mobile electronic devices inserted for charging.

The present invention is needed to provide a unique charging system that efficiently manages large numbers of electronic devices within an organization such as a business, a school, correctional facility, or jail. The present invention is needed to prevent unauthorized charging and provide auditable rules-based security for charging electronic devices. The present invention is needed to enforce electronic device usage limits based on physical return of electronic devices to a charging station, such as a housing with chargers, according to established rules.

SUMMARY OF THE INVENTION

The present invention relates to secured charging for charging tablets, smart phones, mobile electronic devices, mobile computing devices, and other electronic devices. The secured charging system diverts fluids and other debris away from chargers and the mobile computing devices.

The mobile computing devices may include, but are not limited to, tablets, smart phones, iPads, iPods, iPhones, Android devices, televisions, DVD playback devices, Raspberry Pi, Arduino device, radios, MP3 players, wearable devices, fitness trackers, digital audio players, and digital media players. The secured charging system of the present invention limits access to the devices, such as the tablets.

The housing provides charging locations at which each device, such as a tablet, is stored and charged within the housing. A charging device, such as a charger, located at each charging location charges the computing device while the device is stored within the housing. The charging locations are located at fixed locations within the housing. Another embodiment provides wireless charging that allows charging of the devices within the housing. Such wireless charging may be implemented in the storage locations on the conveyor system such that placement of the device within the housing enables charging of the device.

The charging device may provide charging contacts that contact the electrical charging contacts of a mobile electronic device when the device is properly placed into the housing. Other embodiments may implement wireless charging as discussed below such as inductive charging.

In one embodiment, the charging system identifies the mobile electronic device by exchanging identification data with the device electronically and communicates with a central server. In one embodiment, the server creates a charge request to charge the device. The central server compares the charge request against a database of charging rules which apply to the specific mobile electronic device. If the rules are met, the central server communicates to the charger that charging is allowed for the device. Once the secure charger receives authorization from the central server, electricity flows through the charging conductors between the secure charger and the mobile electronic device for charging the battery of the mobile electronic device. The charger may also charge the device according to a charging profile associated with the device or a device having conditions similar to the device.

In another embodiment, the secure charger may also be implemented with a locking system for securing the mobile electronic device until authentication of the user and device are completed by an authentication system. Such an authentication system may be implemented locally or remotely, such as on a server. The authentication system verifies the identity of the user.

A rules logic system, such as a server, may apply the rules of the system. Such rules may be implemented by the facility. Once verified against a database of rules, the housing releases the mobile electronic device for removal of the device from the housing.

In one embodiment, an administrator inputs charging rules into a central server database using a web form. The administrator specifies a rule defining the devices allowed to charge, the times charging is allowed, and the users allowed to unlock the mobile electronic device from the secure charger. Upon request by the secure charger, the central server uses the predefined rules setup by the administrator to determine whether the mobile electronic device should be charged while connected to the secure charger. In this embodiment, the central server also authenticates end users requesting the release of a mobile electronic device locked in the secure charger and determines whether to unlock the mobile electronic device based on the rules established by the administrator.

Controlling the charging of the devices enables administrators to control usage of the devices that may not be connected to a network. Administrators may selectively charge devices to control usage of the devices. Without a charge, users cannot use or misuse the devices. Administrators simply stop charging selected devices to limit use of the device.

Passwords have traditionally controlled access to a WIFI system. However, the users can access, use, and misuse the device without WIFI access. The present invention limits usage of electricity to eventually limit the usage of unauthorized devices. If the unauthorized devices cannot be charged, usage of the unauthorized devices will eventually cease.

Most devices provide a port for accepting a charger. The charging port may accept USB, USB micro, USB mini, Lightning, or other electrical insertion connection. New connections with new ports will more than likely be developed in the future. In some embodiments, a charging adapter of the present invention inserts into the port of the device. The charging adapter can be modified to function with the new ports and electrical insertion connections. In other embodiments, charging could be provided by inductive charging pads, ultrasonic transmission, light transmittal, or other energy transmittal mechanisms that charge mobile electronic devices.

In some embodiments, the charging system also provides a protective housing for the device. The housing is keyed to the charging station, such as the housing, to orient the device when inserting the device into the charging station. The charging adapter is secured within the housing to enable charging of the device. Keyed locks or audible alarms could increase the security features of the present invention.

The housing of one embodiment protects the device from damage. The housing may also prevent access to certain features of the device. Eliminating access to these features prevents users from gaining unauthorized access to the device. The housing also prevents users from resetting the device to allow unfettered access to the user.

It is an object of the present invention to provide centrally controlled mobile electronic device locking.

It is an object of the present invention to limit exposure of electronic devices to damage from liquids or other debris inserted into the housing.

It is an object of the present invention to track and record activity related to mobile electronic device insertion into and removal from a plurality of charging bases.

It is an object of the present invention to store devices within a housing.

It is an object of the present invention to limit access to devices stored within the housing.

It is an object of the present invention to charge the devices while the devices are within the housing.

It is an object of the present invention to provide centrally controlled mobile electronic device charging.

It is an object of the present invention to enable charging to mobile electronic devices only when administrative rules have been met.

It is an object of the present invention to track and record activity related to mobile electronic device charging and present it in usable form for billing or other administrative purposes.

It is an object of the present invention to prevent charging of mobile electronic devices to unapproved devices connected to a secure charger.

It is an object of the present invention to securely charge an approved mobile electronic device within secure storage.

It is an object of the present invention to limit access to the electronic device by storing the device within the secure storage.

It is an object of the present invention to monitor usage of the electronic device by maintaining records of users who remove the device from the secure storage.

It is an object of the present invention to monitor charging of the electronic device by maintaining records of device presence on the secure charger and activation of charging to the device.

It is an object of the present invention to control access to the electronic device by restricting user's access to the device from the storage.

It is an object of the present invention to control access to the electronic device by allowing users access to the device from the storage.

It is another object of the present invention to simplify the process of administrating the charging of multiple mobile electronic devices across an organization.

It is another object of the present invention to reduce the costs associated with charging multiple devices.

It is another object of the present invention to reduce unauthorized use and misuse of devices by restricting charging a mobile electronic device which has not been approved by the organization.

It is another object of the present invention to charge multiple mobile electronic devices within a single charging station.

It is another object of the present invention to limit access to selected users of the mobile electronic device.

It is another object of the present invention to limit access to selected features of the mobile electronic device.

It is another object of the present invention to clean, disinfect, and/or sanitize the mobile electronic device.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
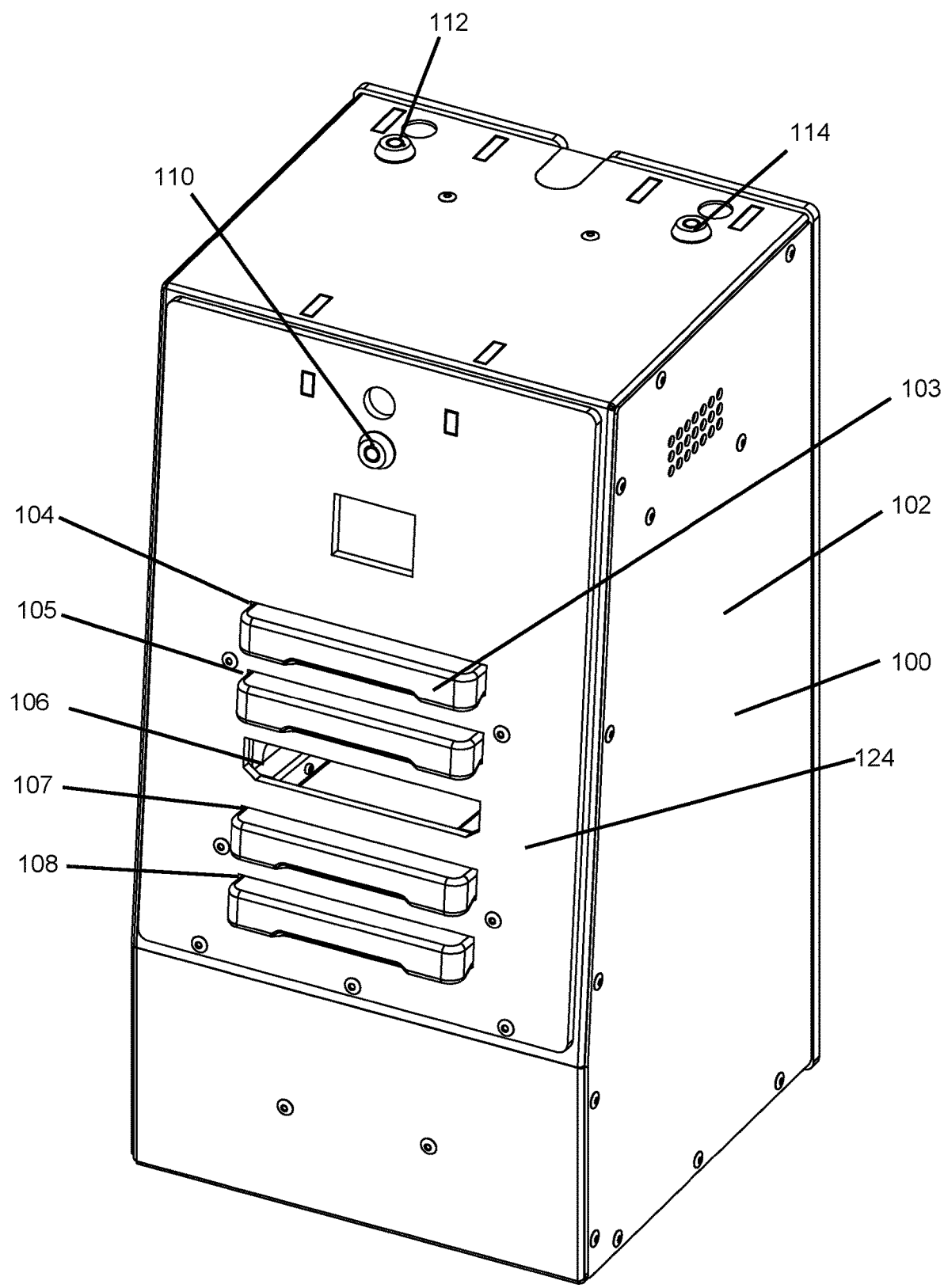
FIG. 1 is an environmental view of one embodiment of the present invention.
Figure 2:
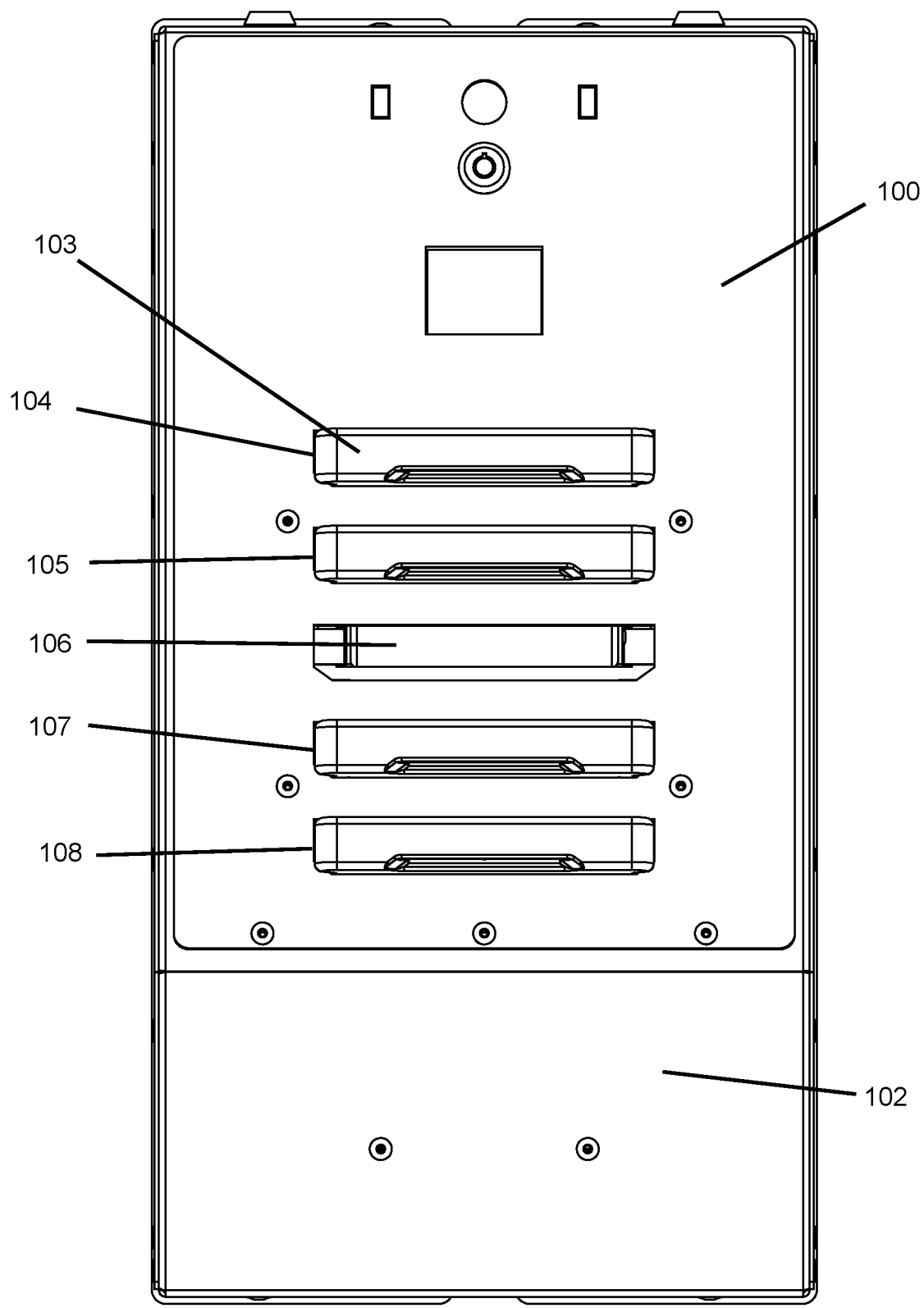
FIG. 2 is a front view thereof.
Figure 3:
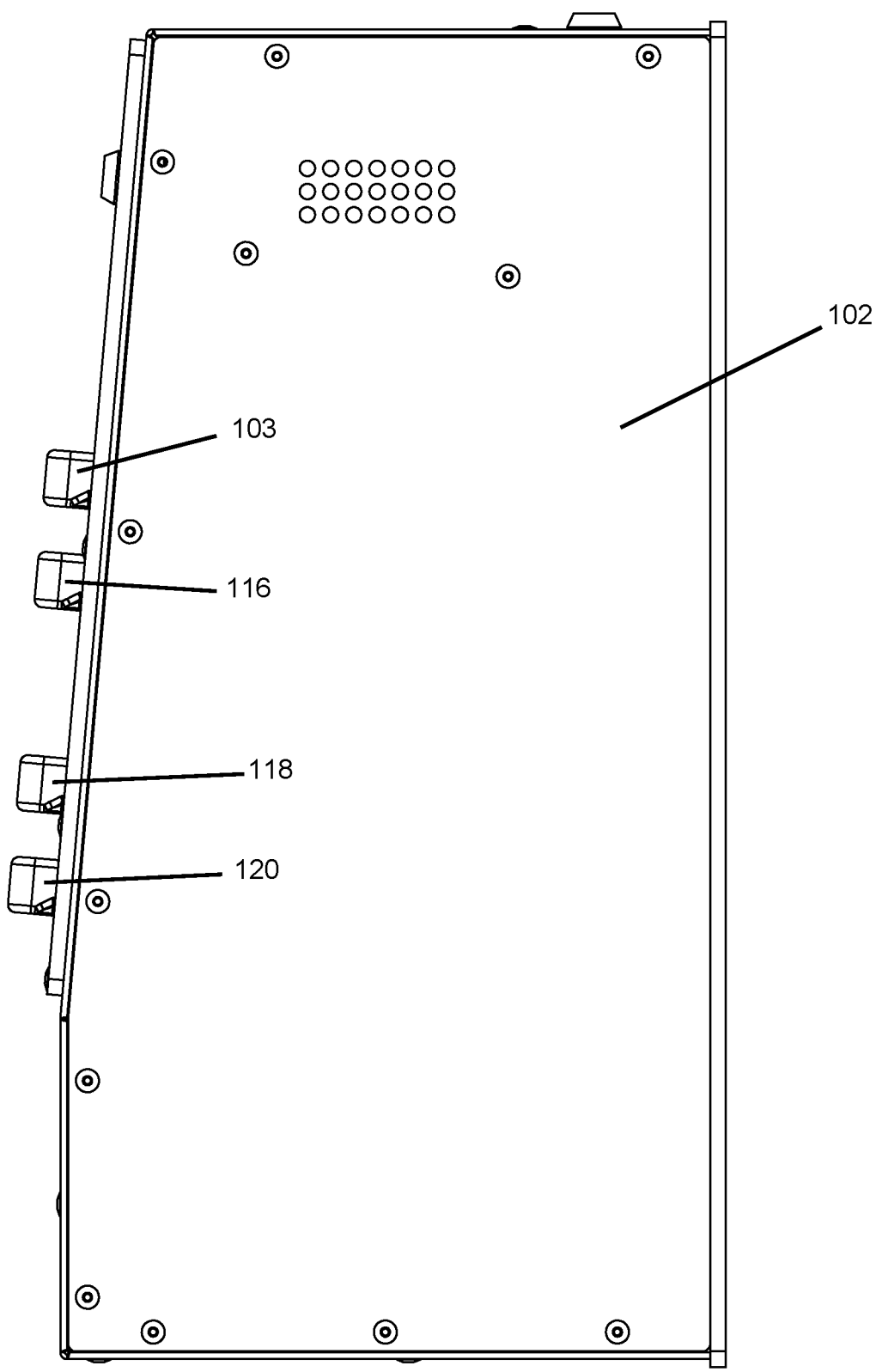
FIG. 3 is a right side view thereof, the left side view being a mirror image of the right side view.
Figure 4:
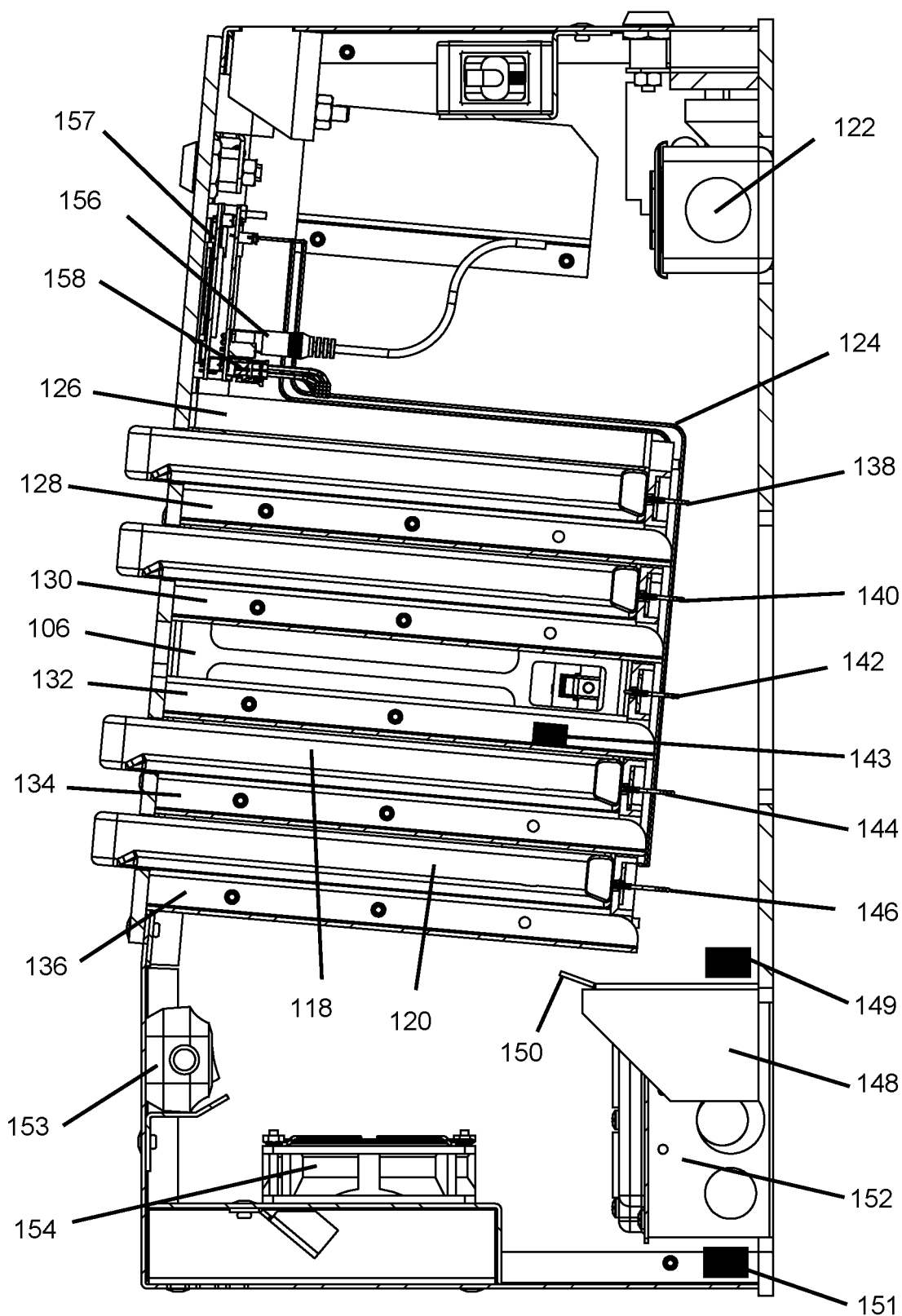
FIG. 4 is a sectional view thereof.

FIGS. 1-3 show an environmental view of one embodiment of the charging system 100 for storage and charging of a mobile computing device. The charging system 100 provides a housing 102 that at least partially encloses a mobile computing device 103, 116, 118, 120 as shown in FIGS. 1 and 4. The charging system 100 has been described as operating for a mobile computing device. The mobile computing devices may include, but are not limited to, tablets, smart phones, iPads, iPods, iPhones, Android devices, televisions, DVD playback devices, Raspberry Pi, Arduino device, radios, MP3 players, wearable devices, fitness trackers, digital audio players, and digital media players. The charging system 100 simplifies the process of charging the devices by removing the need to insert a plug into the port of the device to charge.

Most devices, such as tablets, provide a port for accepting a charger. The port may accept USB, USB micro, USB mini, Lightning, or any other electrical insertion connection. A charging adapter as taught by U.S. Pat. Nos. 9,917,455 and 10,225,734 inserts into the port of the device, which is hereby incorporated by reference. The case secures the charging adapter within the port. The charging adapter provides two charging contacts that provide power to the battery of the device.

The charging system 100 provides a housing 102 to store the electronic devices and at least one, preferably multiple, charging locations within the housing 102. The user inserts an electronic device, such as a tablet, into the housing 102 at the storage aperture 104, 105, 106, 107, 108.

Inserting the device 103 into the housing at storage aperture 104, 105, 106, 107, 108 enables charging of the device 103. The device 103 contacts charging pins of the charger to charge the computing device.

Another embodiment provides wireless charging that allows charging of the devices within the housing. Such wireless charging may be implemented in the storage locations within the housing. Different wireless chargers may be located throughout the housing or on the platforms at which the devices are stored.

Locks within the housing 102 limit access of the devices. Locks located within the housing 102 secure the devices within the housing 102. The devices are inserted within the storage apertures 104, 105, 106, 107, 108. Users insert and remove the devices 103 via the storage apertures 104, 105, 106, 107, 108. The housing may provide multiple storages apertures accept and release the devices.

Referring to FIGS. 1 and 2, the storage apertures 104, 105, 106, 107, 108 are keyed for the devices. The storage apertures 104, 105, 106, 107, 108 direct insertion of the devices in the proper orientation with the charger. The storage apertures 104, 105, 106, 107, 108 limit insertion of the computing devices to reduce improper insertion of the computing device into the housing. Inserting the device in the wrong orientation could prevent charging of the device and could prevent locking of the device within the housing 102.

FIGS. 1 and 2 show locks 110, 112, 114. Locks 112, 114 secure the housing 102 to the wall or other structure of the facility in which the housing is installed. Lock 110 secures charging unit 124 to the housing. Different charging units 124 may be installed within the housing 102. The charging units 124 can be removed and replaced within the housing 102 as shown in FIGS. 10-13.

FIGS. 1, 3, and 4 show devices 103, 116, 118, 120 stored within the storage apertures. The devices 103, 116, 118, 120 are positioned to contact chargers 138, 140, 142, 144, 146. The devices 103, 116, 118, 120 partially protrude outward from the front wall of the housing 102. Another embodiment shown in FIGS. 8 and 9 store the devices to limit the amount of the device protruding outward from the front wall.

The housing 102 secures the devices 103, 116, 118, 120 within the storage apertures 104, 105, 106, 107, 108. The devices of one embodiment are secured within the housing whether the devices are fully inserted into the housing or partially protruding from the housing.

FIG. 4 shows the charging of the devices 103, 116, 118, 120. Chargers 138, 140, 142, 144, 146 of one embodiment provide charging contacts 178, 180 and data contacts 176, 182 that allow data transfer between the charging system, server, and the electronic devices as shown in FIGS. 4 and 7-9. Another embodiment wirelessly charges the devices and wirelessly transfers data between the controller and/or server and the devices 103, 116, 118, 120.

The housing 102 protects the devices 103, 116, 118, 120 and the internal components to limit potential damage to the components. Such components include, but are not limited to, power sources 122, 152, 153, controller 157, connectors 156, 158, and fan 154.

Angling of supports 128, 130, 132, 134, 136 protects the devices 103, 116, 118, 120. The devices 103, 116, 118, 120 are inserted into the charging unit 124 onto supports 128, 130, 132, 134, 136. These supports 128, 130, 132, 134, 136 are angled for storing the devices 103, 116, 118, 120. The supports 128, 130, 132, 134, 136 angle downwards. The downward angle of supports 128, 130, 132, 134, 136 drains liquids that may be poured into the insertion apertures 104, 105, 106, 107, 108. The downward angle of supports 128, 130, 132, 134, 136 directs debris inserted into the insertion apertures 104, 105, 106, 107, 108 downward off of supports 128, 130, 132, 134, 136.

Supports 128, 130, 132, 134, 136 angle downwards to store the devices 103, 116, 118, 120 not level. Unlevel storage of the devices 103, 116, 118, 120 allows liquids to and other debris to flow away from the devices to limit the fluid/debris that the devices 103, 116, 118, 120 may be stored in. Supports 128, 130, 132, 134, 136 are not level to allow for unlevel storage of the devices 103, 116, 118, 120.

The housing also protects power sources 122, 152, 153, fan 154, and controller 157. Charging unit 124 secures into the housing 102. The housing 102 provides an opening for installing the charging unit 124.

The charging unit 124 provides the storage apertures 104, 105, 106, 107, 108 into which the devices are placed and stored. The top wall of the charging unit 124 limits the amount of liquids and debris that can reach components stored above the charging unit 124. The bottom of the charging unit 124 limits the amount of liquids and debris that can reach components stored below the charging unit 124.

Top wall 126 protects components including, but not limited to the connections 156, 158, controller 157, and power source 122. Top wall 126 limits fluids and other debris inserted through the storage apertures 104, 105, 106, 107, 108 from reaching the components above the top wall of the charging unit, including but not limited to the connections 156, 158, controller 157, and power source 122. The protection provided by the top wall 126 limits damage to the components above the top wall, including but not limited to the connections 156, 158, controller 157, and power source 122.

Support 136 forms a lower surface of the charging unit 124. Support 136 protects components including power sources 152, 153 and fan 154. Support 136 limits fluids and other debris inserted through the storage apertures 104, 105, 106, 107, 108 from reaching the components below the bottom, support 136, of the charging unit, including but not limited to the power sources 152, 153 and fan 154 located below the support 136. The protection provided by the support 136 and the charging unit 124 limits damage to the components, positioned below the charging unit 124 and the support 136, including but not limited to the power sources 152, 153 and fan 154.

Support 136 extends to the rear of the housing 102. The support 136 also angles downwards. The support 136 directs fluids and debris to shield 148. Shield 148 extends from the rear of the housing forwards toward the storage apertures 104, 105, 106, 107, 108. The support 136 overlaps with the shield 148. The support 136 directs liquid and debris to the shield 148. The shield 148 extends over the component(s) to be protected, such as power source 152. Shield finger 150 extends forward and angles upward from the shield 148 to direct fluid onto the shield 148. Such a shield finger 150 directs and fluids back onto the shield 148 to protect the internal components of the housing 102.

Figure 5:
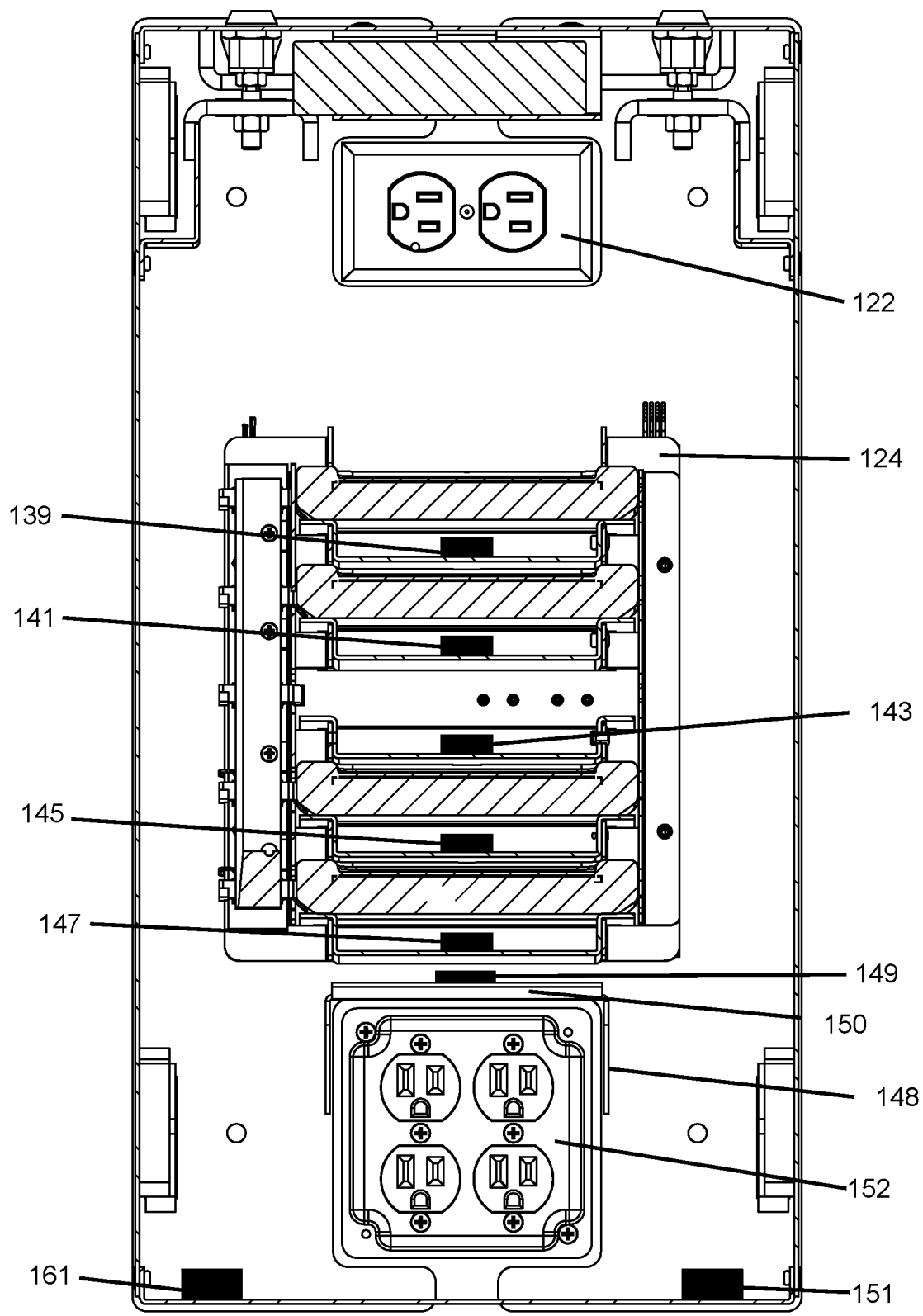
FIG. 5 is a sectional view thereof.

The controller 157 of one embodiment disables the chargers 138, 140, 142, 144, 146 to cease charging of the devices upon detection of liquid within the housing or other issues concerning the chargers and/or devices as shown in FIGS. 4 and 5. Sensors 139, 141, 143, 145, 147, 149, 151, 161 are positioned within the housing to detect liquids within the housing. Controller 157 may then disable the chargers 138, 140, 142, 144, 146 upon the sensors 139, 141, 143, 145, 147, 149, 151, 161 detecting liquid. Disabling the chargers 138, 140, 142, 144, 146 ceases charging of the devices.

Controller 157 may disable specific chargers or disable all chargers within the housing. For example, controller 157 may disable charging via all chargers 138, 140, 142, 144, 146 based upon detection of liquid at one or more sensors 139, 141, 143, 145, 147, 149, 151, 161. Controller 157 may also disable charging via individual chargers 138, 140, 142, 144, 146 based upon detection of liquid by sensor 139, 141, 143, 145, 147 within an individual storage aperture 104, 105, 106, 107, 108. The controller 157 disables the charger associated with the sensor 139, 141, 143, 145, 147 at which liquid is detected.

Sensors 139, 141, 143, 145, 147 detect liquid within individual storage apertures 104, 105, 106, 107, 108 within the drainage space. Similar sensors may be positioned within the other storage apertures 104, 105, 106, 107, 108, such as within the drainage space of the storage apertures 104, 105, 106, 107, 108 as shown in FIG. 5. Liquid(s) draining from storage apertures 104, 105, 106, 107, 108 flow past sensors 139, 141, 143, 145, 147. Sensors 139, 141, 143, 145, 147 within storage apertures 104, 105, 106, 107, 108 detect the presence of liquid within each individual storage aperture 104, 105, 106, 107, 108. The controller 157 may disable only the specific charger 138, 140, 142, 144, 146 located at the sensor 139, 141, 143, 145, 147 that detects the liquid. The controller 157 may also disable all chargers 138, 140, 142, 144, 146 upon detection of liquid by any of the sensors 139, 141, 143, 145, 147, 149, 151, 161.

Sensors 149, 151, 161 are positioned within housing to detect liquid within the housing 102. Sensors 149, 151, 161 detect liquid that may have entered the housing 102 through storage apertures 104, 105, 106, 107, 108. Sensors 149, 151, 161 detect liquid that has entered the charging unit 124 and flowed through the drainage spaces 127 below the supports 128, 130, 132, 134, 136.

Drainage spaces 127 direct the fluid to shield 148. Sensor 149 placed at the shield 148 detects liquid at the shield. The liquid may then flow from shield 148 to the bottom of the housing. Sensors 151, 161 placed at the bottom of the housing 102 detect liquid at the bottom of the housing. In one embodiment, at least one of sensors 151, 161 is placed at the drain in the housing. A sensor 151, 161 placed at the drain detects liquid as the liquid leaves the housing 102.

Sensors 149, 151, 161 detect liquid within the housing. Sensors 149, 151, 161 do not provide specific information as to the charger from which the liquid originated. Controller 157 of such an embodiment disables all chargers 138, 140, 142, 144, 146 upon detecting liquid by at least one of sensors 149, 151, 161.

The controller 157 may also detect liquid at the chargers 138, 140, 142, 144, 146. The controller 157 may include an amp surge sensor. The amp surge sensor would detect an amperage on the charging lines larger than the defined limit. The increased amperage detected by the controller 157 alerts the system that an issue exists with the chargers or the device at the charger, such as the presence of liquid at the charger or a problem with the device.

The increased amperage detected by the controller may identify issues with the device located at the charger. Such issues may include, but are not limited to a bad battery, a short, an unauthorized device, or other potential issues.

Upon detecting the increased amps at the charger, the controller may disable the charger or all of the chargers. The system may also trigger an alarm, message, or other alert to the appropriate users, including, but not limited to, administrators, personnel, security officers, police, IT personnel, etc.

Another embodiment of the present invention triggers an alert, such as an alarm or a message indicating an issue, such as detection of a liquid by sensors 139, 141, 143, 145, 147, 149, 151, 161 or controller 157 or an issue with the device or charger. The alert may be an audible alert, such as a siren, sound, or other audible signal, a visual alert, such as a light or other visual indicator, or both audible and visual alert. The alert may also be a text message, a message, an email, a digital message, an audible message sent via phone or application, etc.

The alert may indicate the location of the facility at which the housing is located, the location of the housing within the facility, the status of the charging system, the identifier of the housing, the identification of the devices stored within the housing, the status of the devices stored within the housing, and the status of the chargers. The alert may also provide additional information that may be useful to the user, including the condition detected, such as the detection of liquid or increased amps at the charger.

The alert may also allow the user to enable and/or disable the chargers of the housing. The alert may also provide any video or audio of the housing at the time that the liquid was detected. Such video and/or audio may allow the user to identify the person responsible for the liquid within the housing or other issues. A camera and/or microphone may be located within the housing or may be located within the facility aimed at the housing to capture the audio/video of the housing.

The controller 157 then enables the chargers 138, 140, 142, 144, 146 after the situation is resolved. Such resolution may occur when the sensors no longer detect liquid, after a user reactivates the chargers, or that the amperage at the chargers drops within the expected range. The chargers 138, 140, 142, 144, 146 may then charge the devices located at the associated chargers.

The chargers 138, 140, 142, 144, 146 are stored within a charging unit 124. The charging unit 124 enables a modular system that allows different charging configurations for a housing. The charging unit 124 can be removed from the housing 102 and installed within the housing 102. A user can remove the charging unit 124 to repair the charging unit 124, replace the charging unit 124, or install a blank to close the housing. Such a modular charging unit 124 simplifies the process of repairing the charging unit and allowing the proper charging configuration for the facility.

The chargers 138, 140, 142, 144, 146 electrically connect to the charging unit 124. Plugging the charging unit 124 into a power source 122, 152, 153 powers the charging unit 124 and the chargers 138, 140, 142, 144, 146. Electrical connection 156 connects to power source 122. The electrical connection 156 powers the controller 157.

The controller 157 communicates with the server to control components of the charging system. The controller 157 controls the locks and charging of the devices 103, 116, 118, 120. The devices 103, 116, 118, 120 communicate with the server via the controller 157.

The controller 157 detects presence of the devices 103, 116, 118, 120 in the chargers 138, 140, 142, 144, 146. The controller 157 receives instructions from the server concerning releasing the devices to the users, supplying power to charge the devices 103, 116, 118, 120 via the chargers, and communicating identification of the devices 103, 116, 118, 120 to the server.

Connection 158 connects the chargers, the data contacts, and the locks with the controller 157. Connection 158 supplies power to the chargers 138, 140, 142, 144, 146 and the charging contacts of the chargers. Connection 158 also communicates with the devices 103, 116, 118, 120 via the data contacts of the chargers 138, 140, 142, 144, 146.

The chargers 138, 140, 142, 144, 146 accept the devices 103, 116, 118, 120 in a set orientation, preferably a charging orientation. The charging contacts 178, 180 and data contacts 176, 182 correspond with contacts on the device. The supports 128, 130, 132, 134, 136 and storage apertures 104, 105, 106, 107, 108 align the charging contacts 178, 180 of each charger 138, 140, 142, 144, 146 with the charging contacts of the device, such as the tablet. The storage apertures 104, 105, 160, 107, 108 limit insertion of an electronic device to the charging orientation with the charging contacts and data contacts of each device directed to the contacts of the chargers 138, 140, 142, 144, 146.

The chargers 138, 140, 142, 144, 146 connect to a power source, such as power source 122, 152, 153. Charging contacts 178, 180 contact the electronic devices 103, 116, 118, 120 to deliver electricity to the devices for charging. In another embodiment, chargers 138, 140, 142, 144 wirelessly charge the devices 103, 116, 118, 120. Data contacts 176, 182 contact the electronic devices 103, 116, 118, 120 to transfer data between the server and the devices. The charging contacts and identification contacts are located towards the rear of the housing, opposite of the storage apertures 104, 105, 106, 107, 108.

The chargers 138, 140, 142, 144, 146 of one embodiment provide two charging contacts 178, 180 for contacting the charging contacts of an electronic device, such as a charging adapter electrically connected to the electronic devices. Electricity flows from the chargers 138, 140, 142, 144, 146 to the electronic devices 103, 116, 118, 120 via the charging contacts. The devices can then charge properly without insertion of a cord into the port. The contact between the charging contacts supplies sufficient power to charge the device.

A power source supplies power to the charging contacts 178, 180 within the housing. The keying of the storage apertures 104, 105, 106, 107, 108 prevents users from incorrectly inserting the device onto the conveyor system. The supports 128, 130, 132, 134, 136 accept the electronic devices in the charging orientation. The supports 128, 130, 132, 134, 136 align the charging contacts.

The charging system also provides a protective housing and charging adapter for the device as described in U.S. Pat. Nos. 9,917,455; 10,225,734; 10,256,645; and 10,678,302 which are hereby incorporated by reference. The case of the electronic device is keyed to the storage apertures 104, 105, 106, 107, 108 to orient the device when inserting the device onto the supports. A blocking head of the electronic device is sized not to be inserted into the storage apertures. In one embodiment, the blocking head may be sized larger than the storage apertures. The charging and data transfer of the devices are discussed below.

FIG. 5 shows the placement of the internal components, such as power sources 122, 152, in relation to the charging unit 124. The charging unit 124 obstructs passage from the apertures 104, 105, 106, 107, 108 to the internal components 122, 152. Shield 148 is positioned above components, such as power source 152. The shield finger 150 extends upward to direct the fluid to the rear of the shield 148. The sides of shield 148 extend downward to provide additional protection to the internal component. The fluids flow to the bottom of the housing off the sides of the shield. The fluids then exit the housing by flowing through a drain in the housing.

Figure 6:
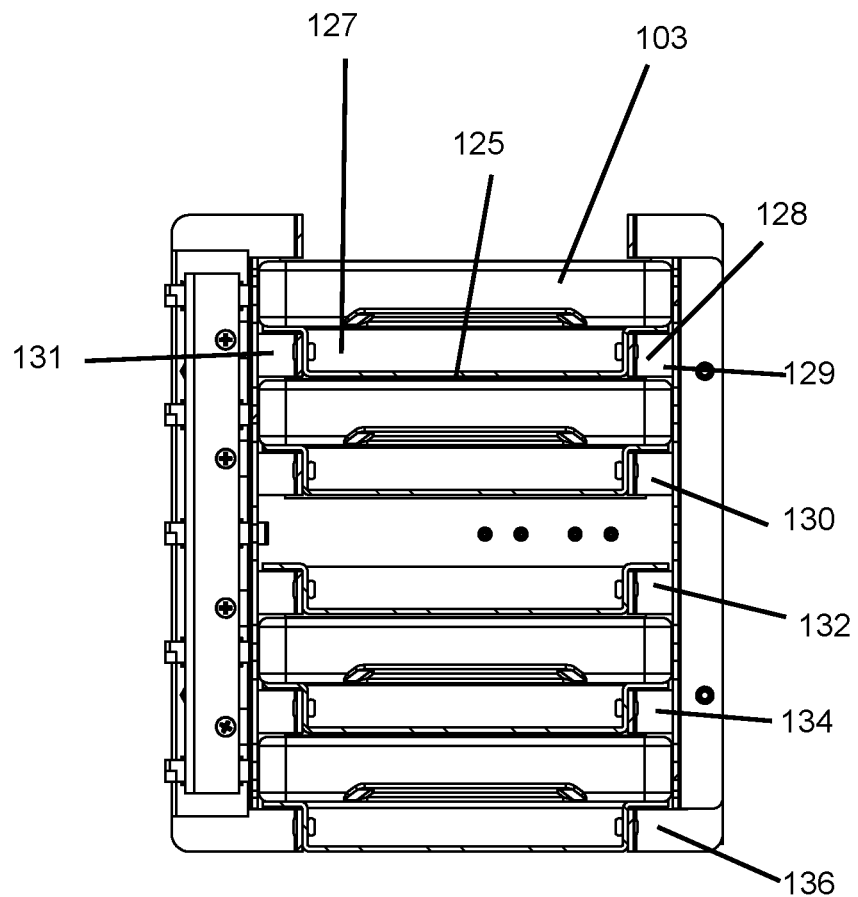
FIG. 6 is a front view of a charging unit of one embodiment of the present invention.

FIG. 6 shows the charging unit 124 and the supports 128, 130, 132, 134, 136. Each support 128, 130, 132, 134, 136 provides two support fingers 129, 131 that support the device 103 above drainage space 127. Drainage space 127 is located between the support fingers 129, 131. The device 103 is stored above drainage space 127. Drainage space 127 allows fluids to flow away from the device and limits the amount of fluid that the device may be stored in.

Base 125 of each storage aperture 104, 105, 106, 107, 108 separate each device stored therein. The bases 125 within each storage aperture 104, 105, 106, 107, 108 angle downwardly to direct fluids to the bottom of the housing. The bases 125 of one embodiment are not level to promote the flow of any fluids off of the bases 125.

In one embodiment, the bases 125 direct the fluids to the shield 148. The bases 125 of one embodiment attach to the support arms 129, 131. The bases 125 of each storage aperture 104, 105, 106, 107, 108 direct fluids away from the devices stored at the storage apertures 104, 105, 106, 107, 108 to limit damage to the devices stored therein.

Figure 7:
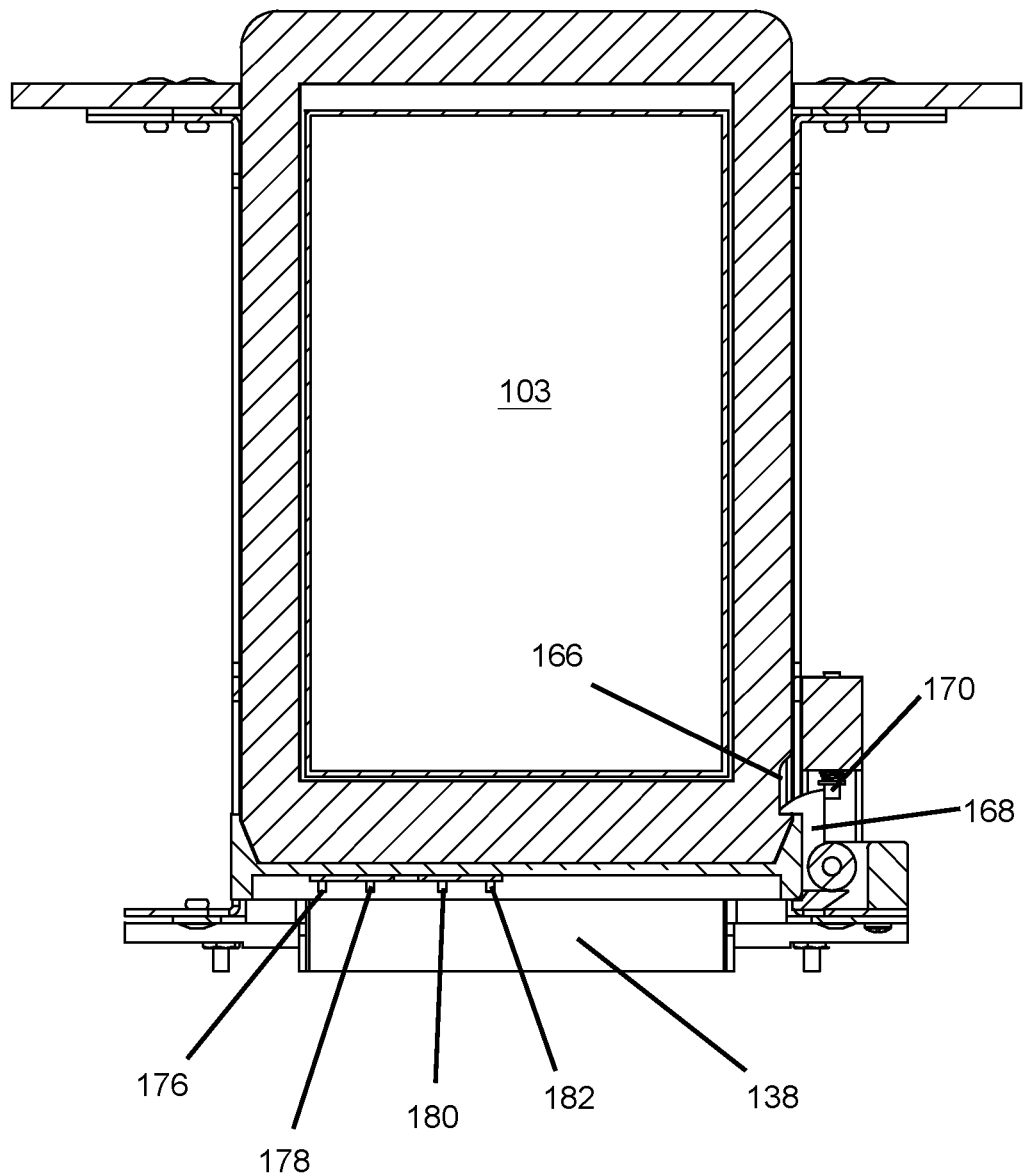
FIG. 7 is a partial top view of one embodiment of the present invention.

FIG. 7 shows the storage aperture with device 103 stored within. The device contacts charger 138. In one embodiment, charger 138 is similar to chargers 140, 142, 144, 146. The charger 138 charges the device 103 via charging contacts 178, 180. The charger 138 also transfers data between the server and device 103 via data contacts 176, 182.

The device 103 inserts into the charging aperture 104 of the charger 138. Lock 168 secures the device 103 into place within the charging aperture 103. The server via the controller instructs the lock 168 to secure the device 103 and release the device 103. Actuator 170 manipulates the lock 168 to lock and release the device 103. The lock 168 contacts case aperture 166 to secure the device within the housing 160.

Upon releasing the device, actuator 170 releases the lock 168 from the case aperture 166. The device 103 is free from lock 168. The user can then retrieve the device 103 from the charging aperture 164 and the housing.

Figure 8:
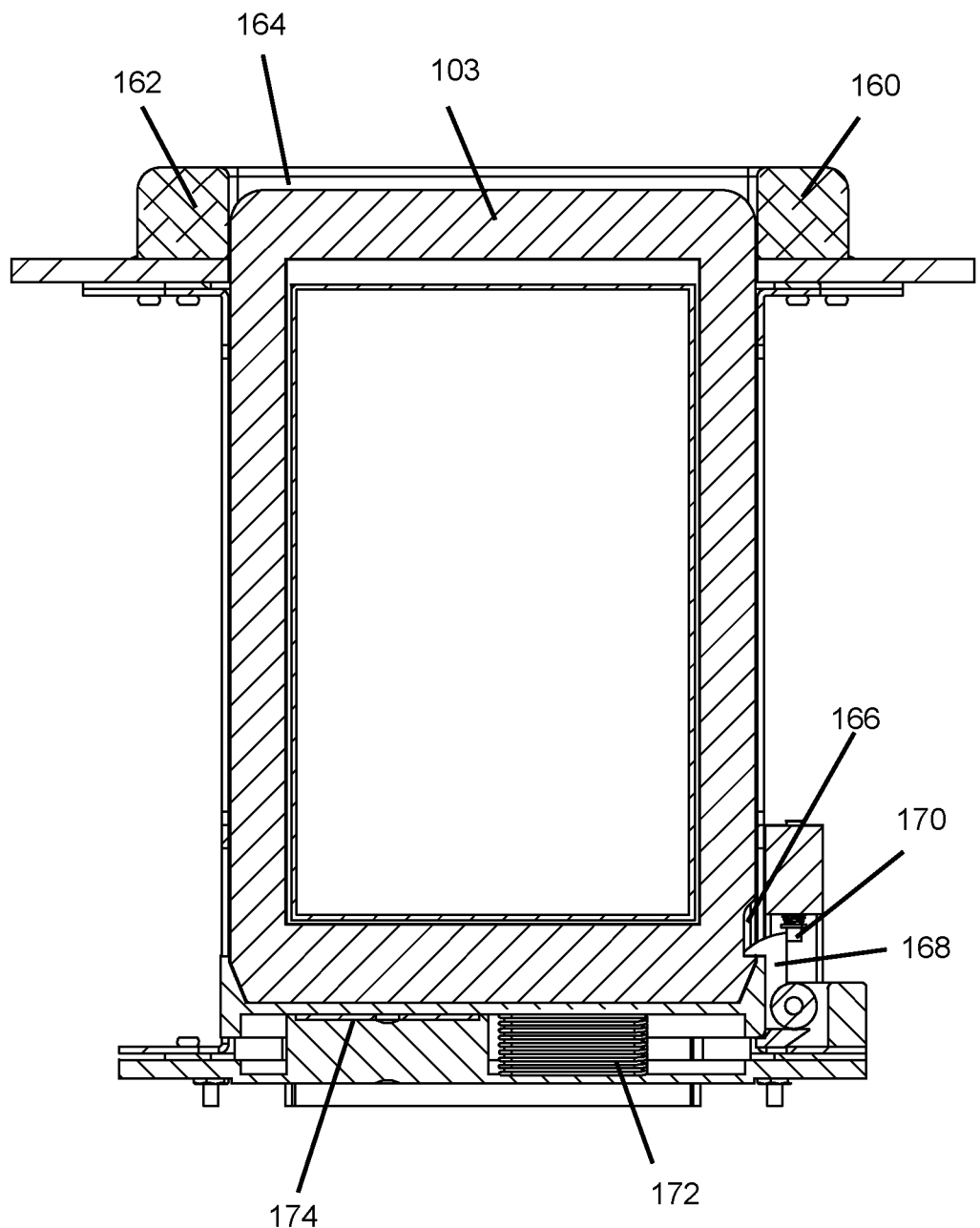
FIG. 8 is a partial top view of one embodiment of the present invention.
Figure 9:
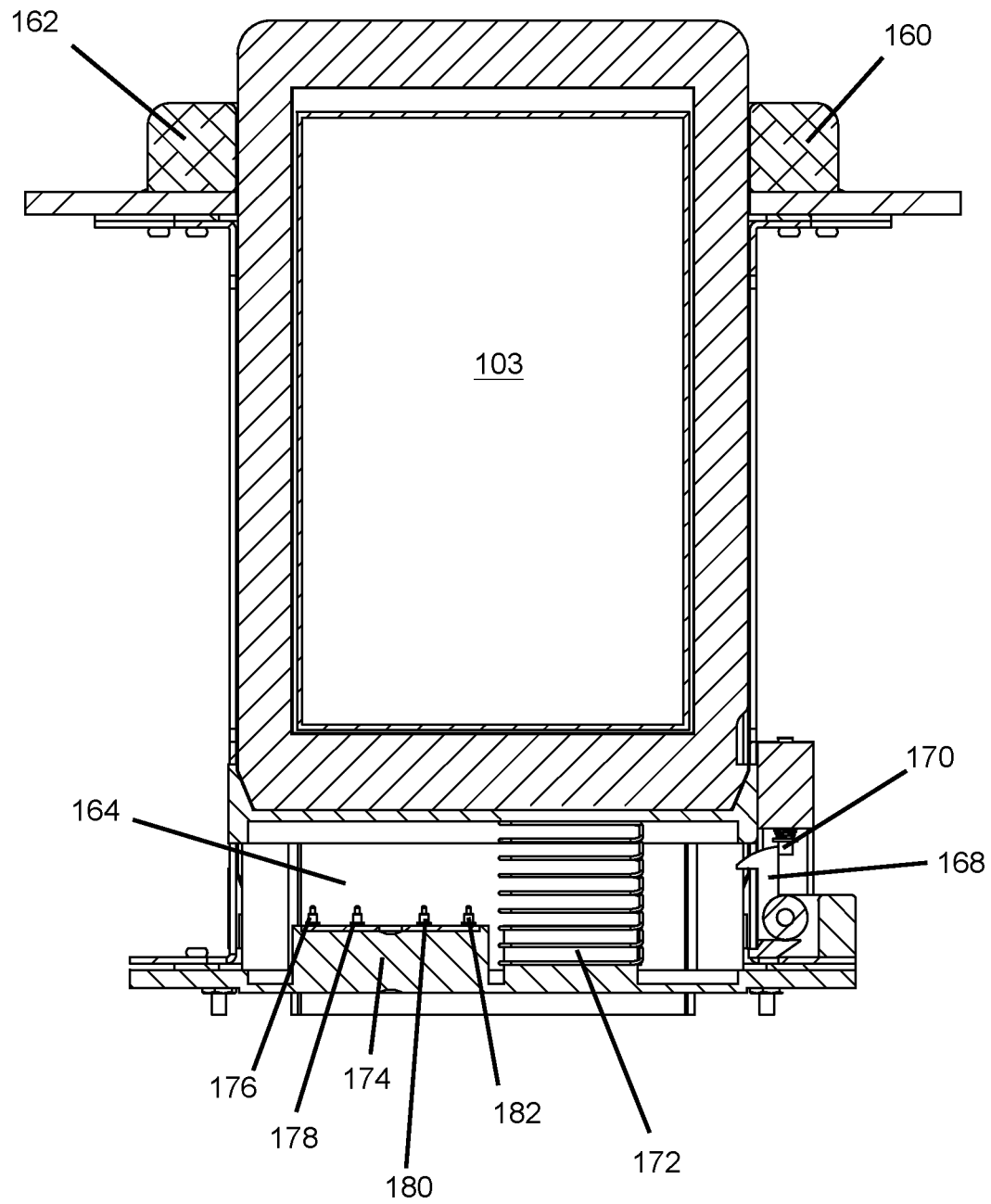
FIG. 9 is a partial top view thereof.
Figure 10:
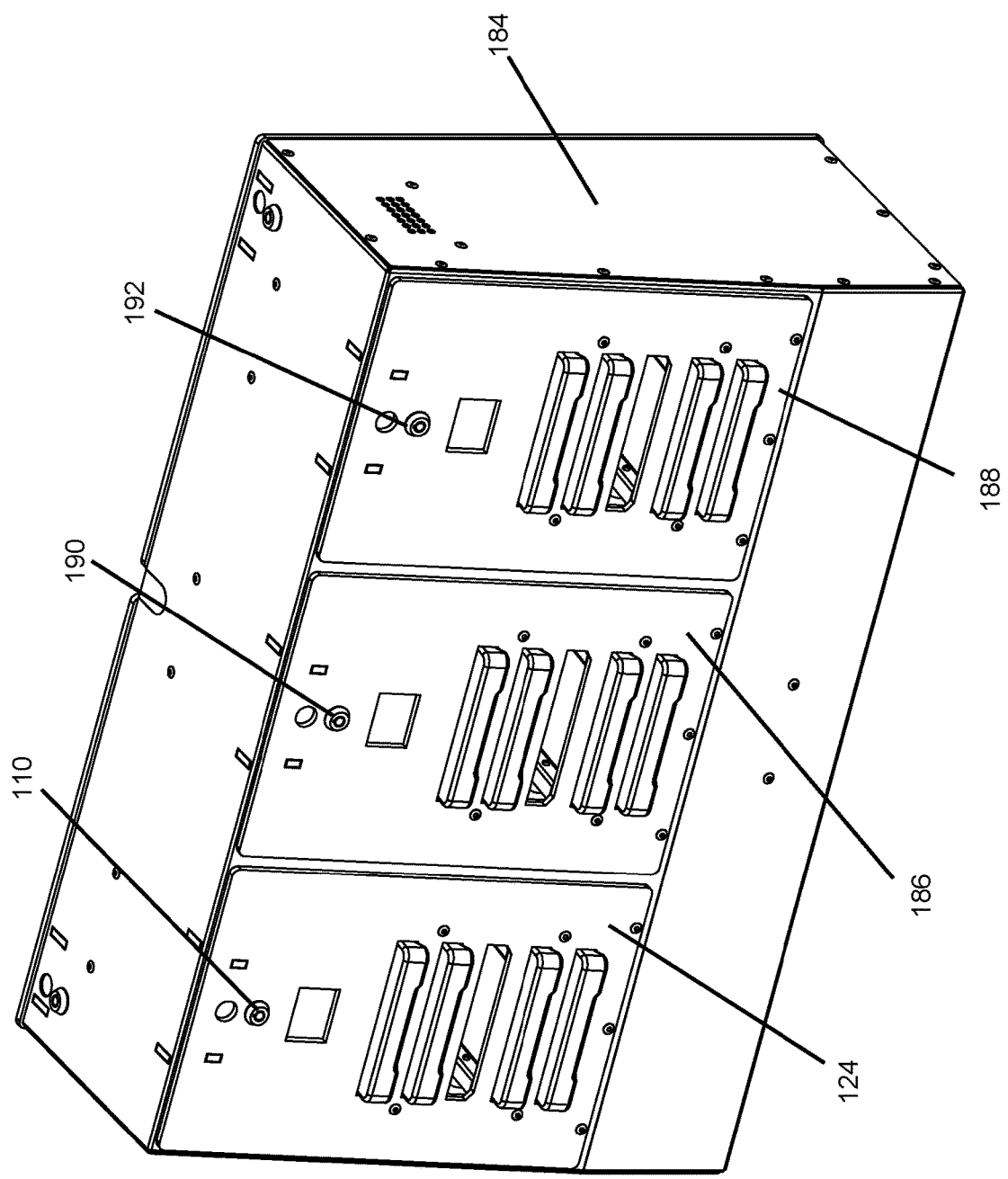
FIG. 10 is a front perspective view of one embodiment of the present invention.

FIGS. 8 and 9 show another embodiment of the present invention that allows insertion of the device 103 past the front wall 162 of the housing 160. The device 103 does not protrude from housing 160 as shown in FIGS. 1 and 3. Such insertion of the device 103 into the housing 160 limits the amount of device 103 exposed outside of the housing 160. A user cannot grab or otherwise manipulate the device protruding from the housing.

The device contacts charger 174. In one embodiment, charger 174 is similar to chargers 138, 140, 142, 144, 146. The charger 174 charges the device 103 via charging contacts 178, 180. The charger 174 also transfers data between the server and device 103 via data contacts 176, 182. The device 103 inserts into the charging aperture 164 of the charger 174 to bias a biasing device 172, such as a spring. Lock 168 secures the device 103 into place within the charging aperture 164 of the housing. The server via the controller instructs the lock 168 to secure the device 103 as shown in FIG. 8 and release the device 103 as shown in FIG. 9. Actuator 170 manipulates the lock 168 to lock and release the device 103. The lock 168 contacts case aperture 166 to secure the device within the housing 160.

Upon releasing the device, actuator 170 releases the lock 168 from the case aperture 166. The biasing device, such as the spring 172 biases the device 103 away from the charger 174 within the charging aperture 164. The device 103 is free from lock 168. The device 103 also protrudes outward from the front wall 162. The user can then retrieve the device 103 from the charging aperture 164 and the housing.

As discussed herein and shown in FIGS. 7-9, the housing and charging system communicate with and charge the electronic devices via the data contacts 176, 182 and the charging contacts 178, 180 of each charger 138, 140, 142, 144, 146, 174 as shown in FIGS. 4-9. The data contacts 176, 182 communicate with the electronic devices to update, upgrade, identify, and check the status of the devices. The system may apply rules to the devices based upon identification and status of the devices. The system may charge each individual device according to a charging profile via the charging contacts 178, 180 as discussed below.

FIGS. 10-13 show charging units 124, 186, 188 within housing 184. Housing 184 provides a modular charging system that allows variation in the number of storage apertures and chargers of the charging system. Locks 110, 190, 192 secure the charging units 124, 186, 188 within the housing 184. Each of the charging units 124, 186, 188 provides storage apertures and chargers. The chargers charge the devices and transfer data between the server and the devices as discussed herein.

Figure 11:
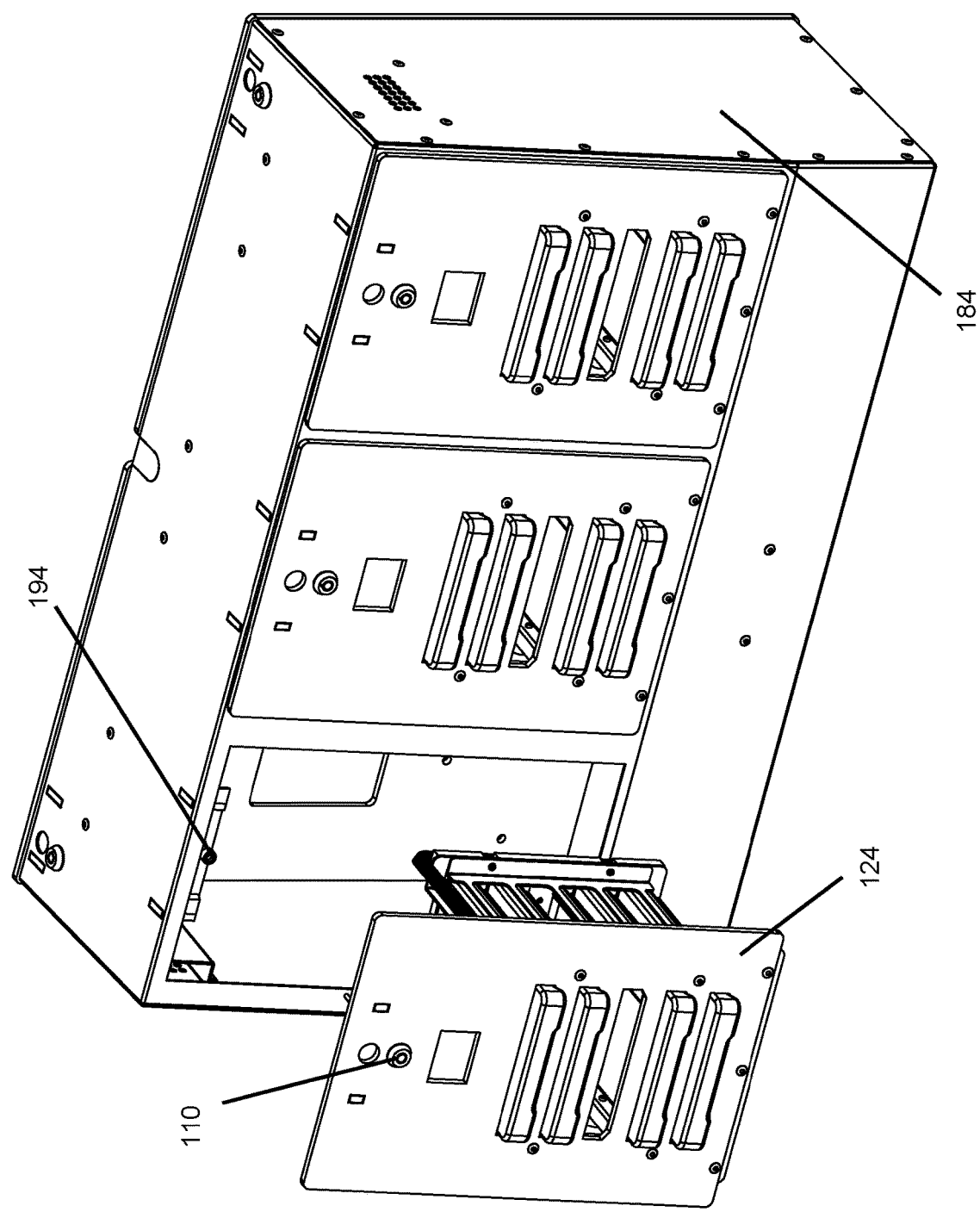
FIG. 11 is a front perspective view thereof.
Figure 12:
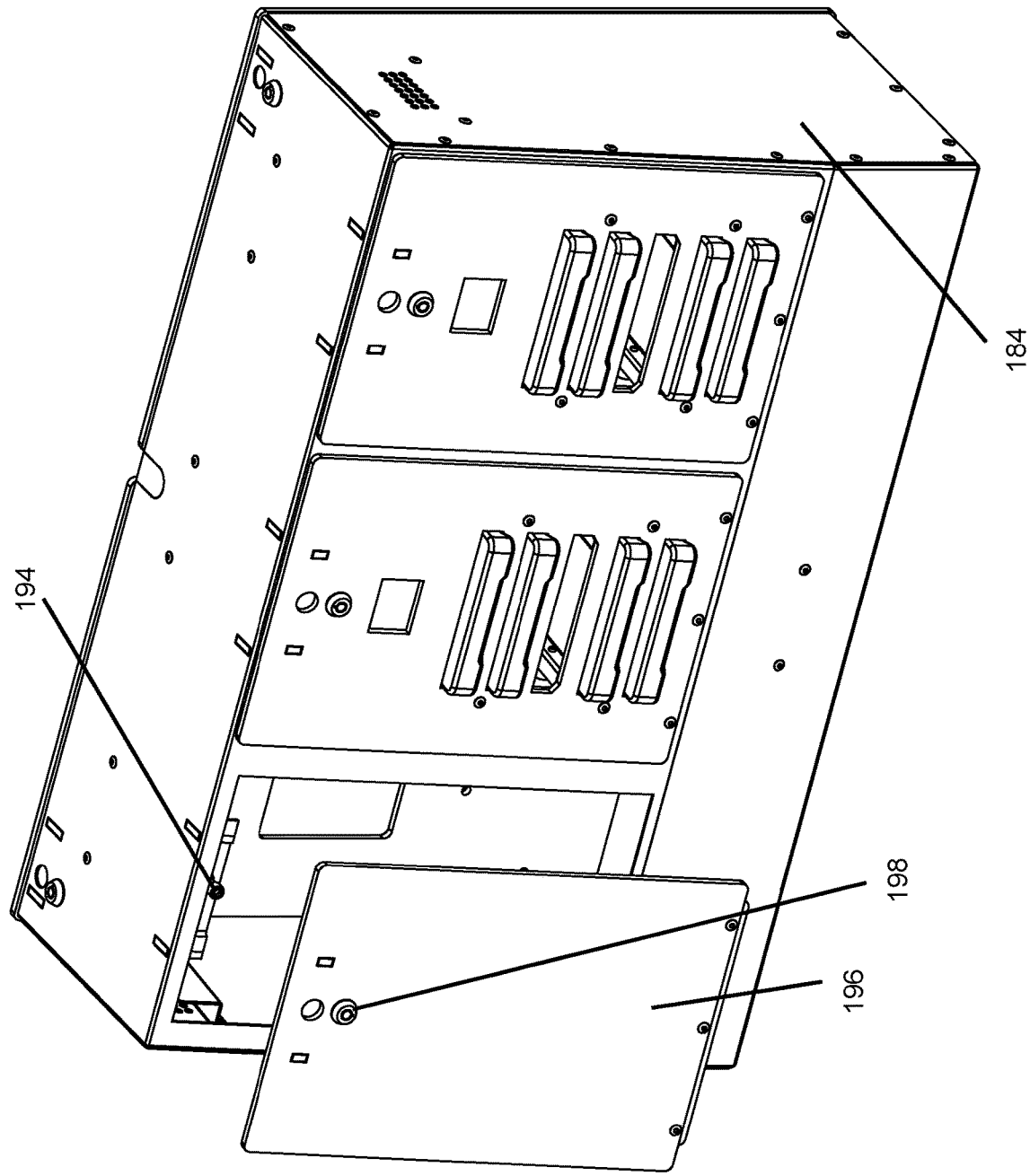
FIG. 12 is a front perspective view thereof.
Figure 13:
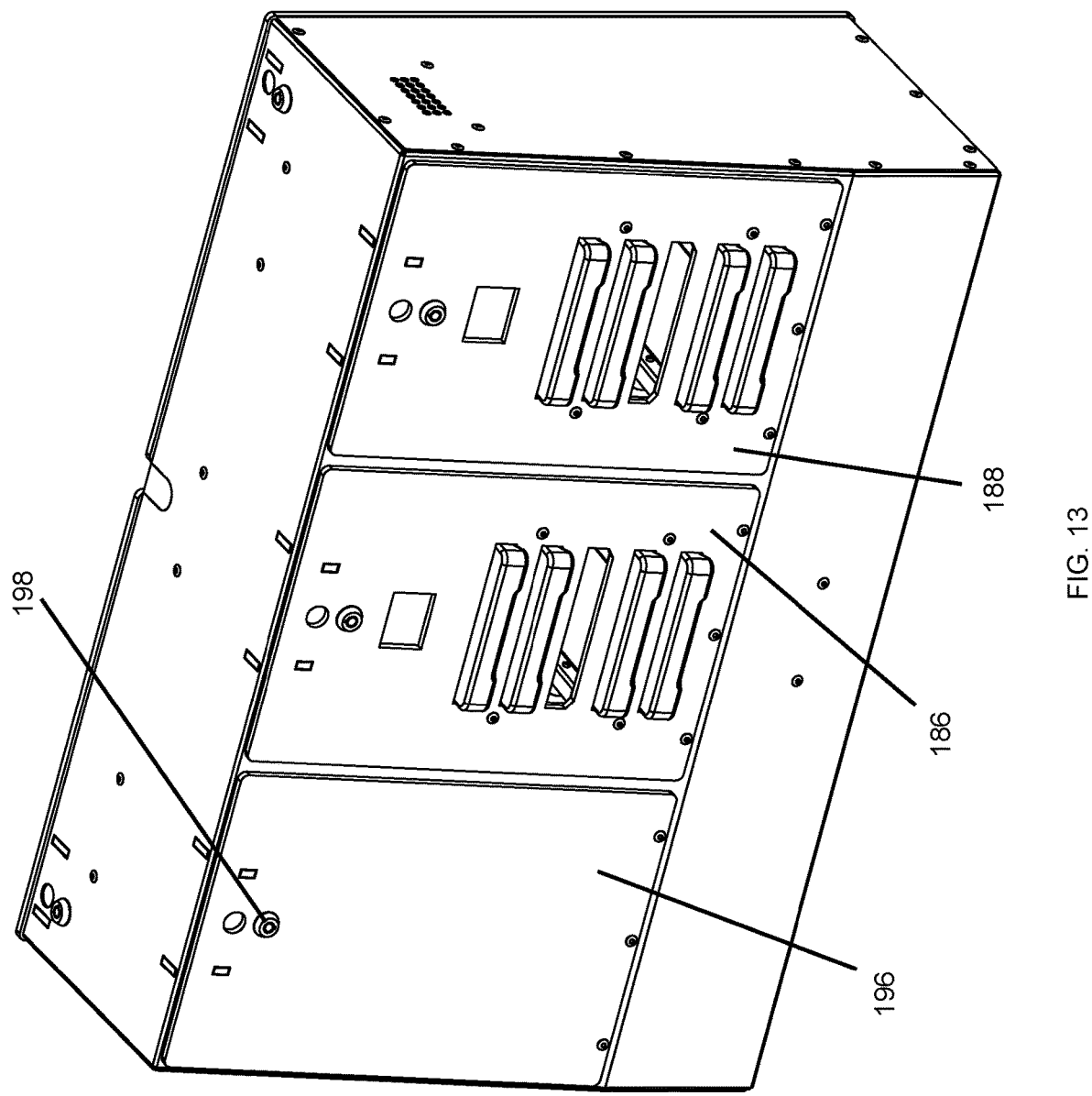
FIG. 13 is a front perspective view thereof.
Figure 14:
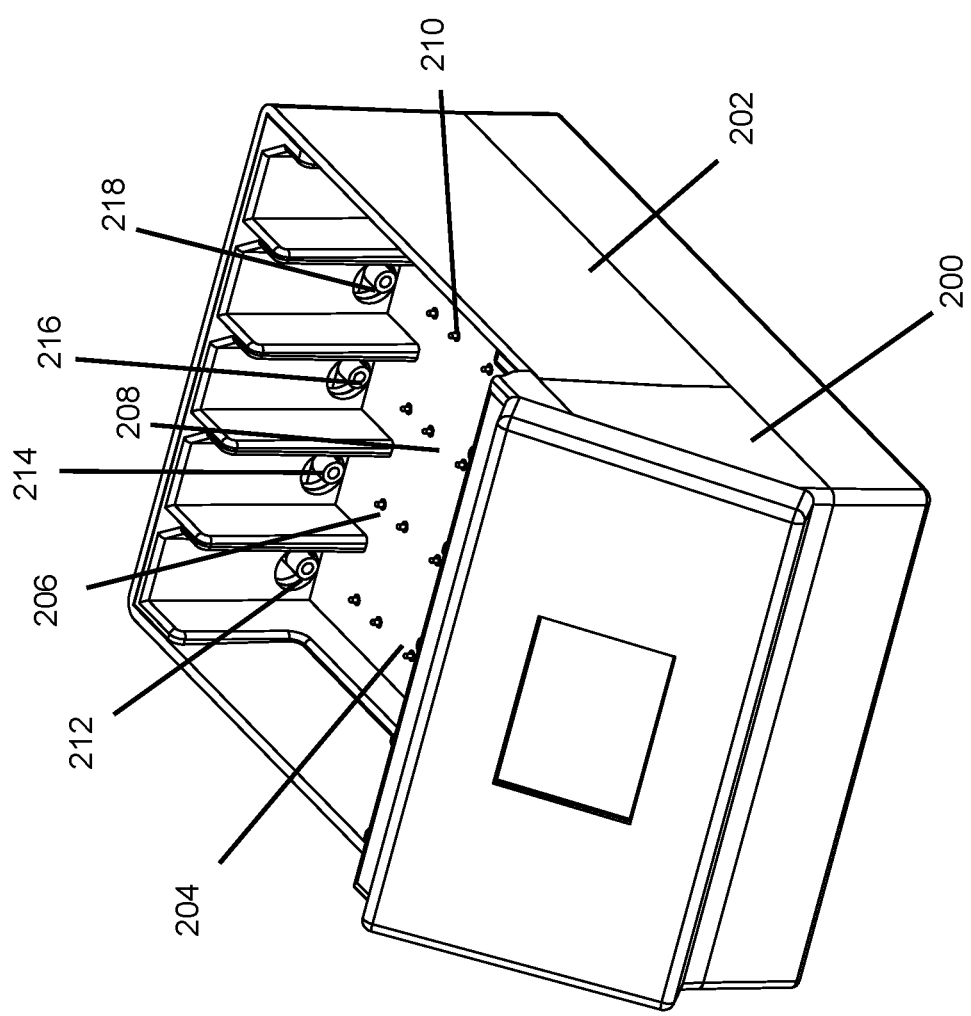
FIG. 14 is a front perspective view of one embodiment of the present invention.

The users may unlock locks 110, 190, 192 to remove the charging units 124, 186, 188 from the housing 184 as shown in FIG. 11. The lock 110 locks into lock receiver 194 of the housing 184. The user can then replace the charging unit with a different charging unit or replace the charging unit with a blank 196 as shown in FIGS. 12 and 13. The blank 196 locks into the housing 194 via lock 198 secured into the lock receiver 194 of the housing 184. Securing the blank 196 into housing 184 closes the housing 184 while removing chargers to reduce to charging units 186, 188. Such modularity enables the facility to configure the chargers available within a housing.

FIGS. 14-17 show another embodiment of a charging system 200 that provides for cleaning and/or clearing the base of the housing. Housing 202 accepts the mobile electronic devices for storage and charging on the base. Housing 202 provides chargers 204, 206, 208, 210 with charging contacts 228, 230 and data contacts 226, 232 as discussed herein.

Figure 16:
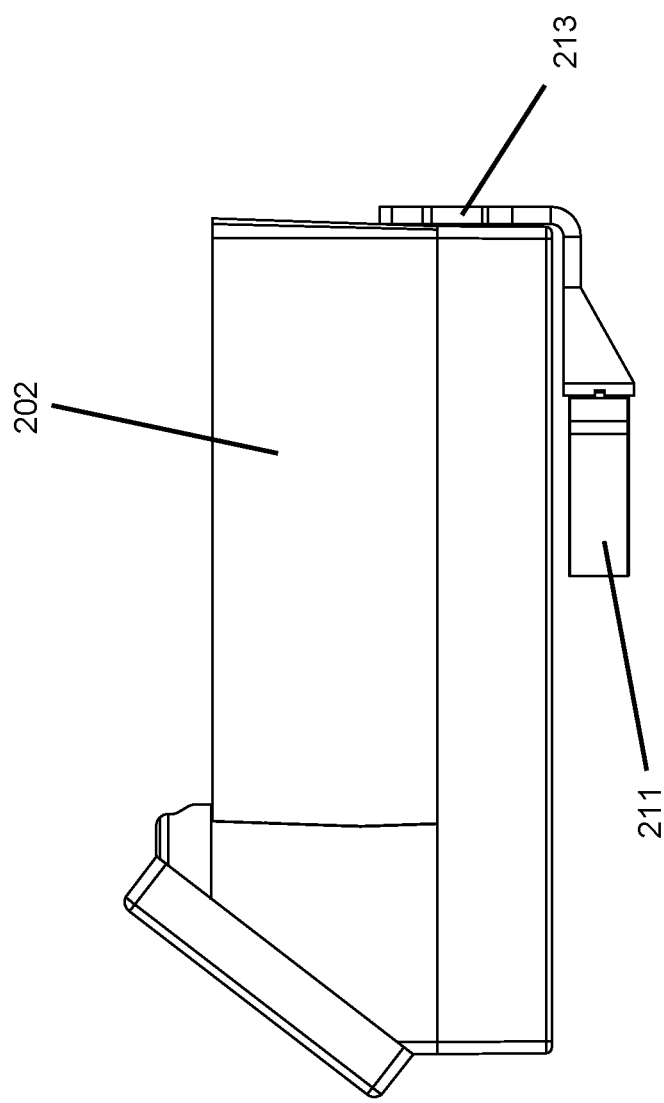
FIG. 16 is a right side view thereof, the left side view being a mirror image of the right side view.
Figure 17:
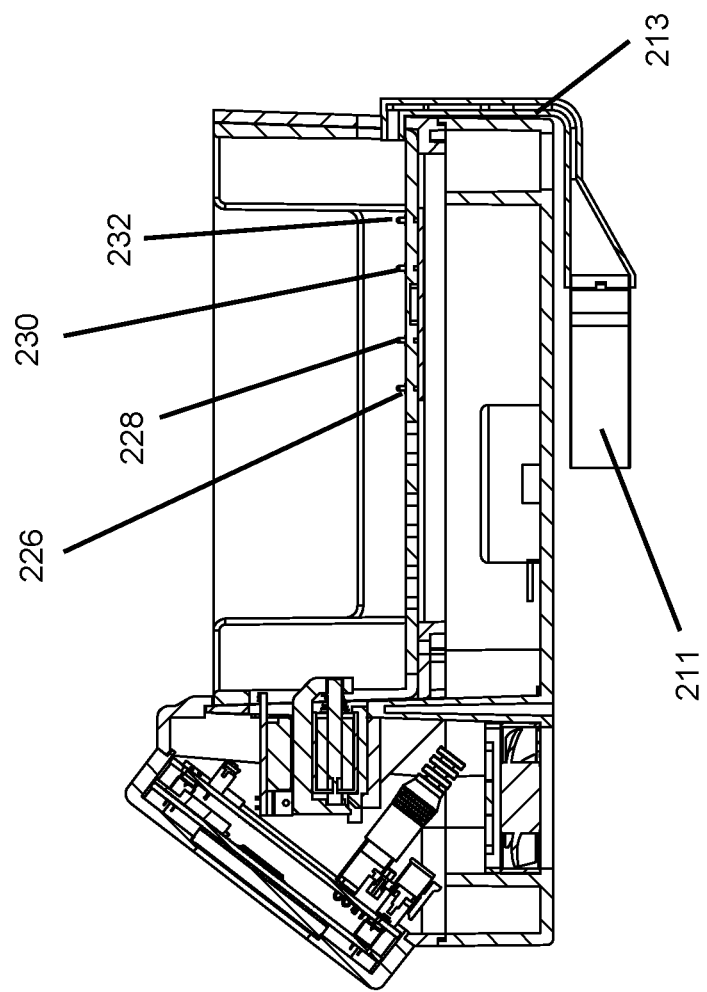
FIG. 17 is a sectional view thereof.

Blowers 212, 214, 216, 218 blow air across the chargers and the base of the housing 202 to clear the housing. Clearing the housing 202 protects the devices stored within the housing and the chargers 204, 206, 208, 210. FIGS. 16 and 17 show blower source 211, such as a fan or other motor, that generates the air flow that passes through conduit 213 to blowers 212, 214, 216, 218.

Figure 15:
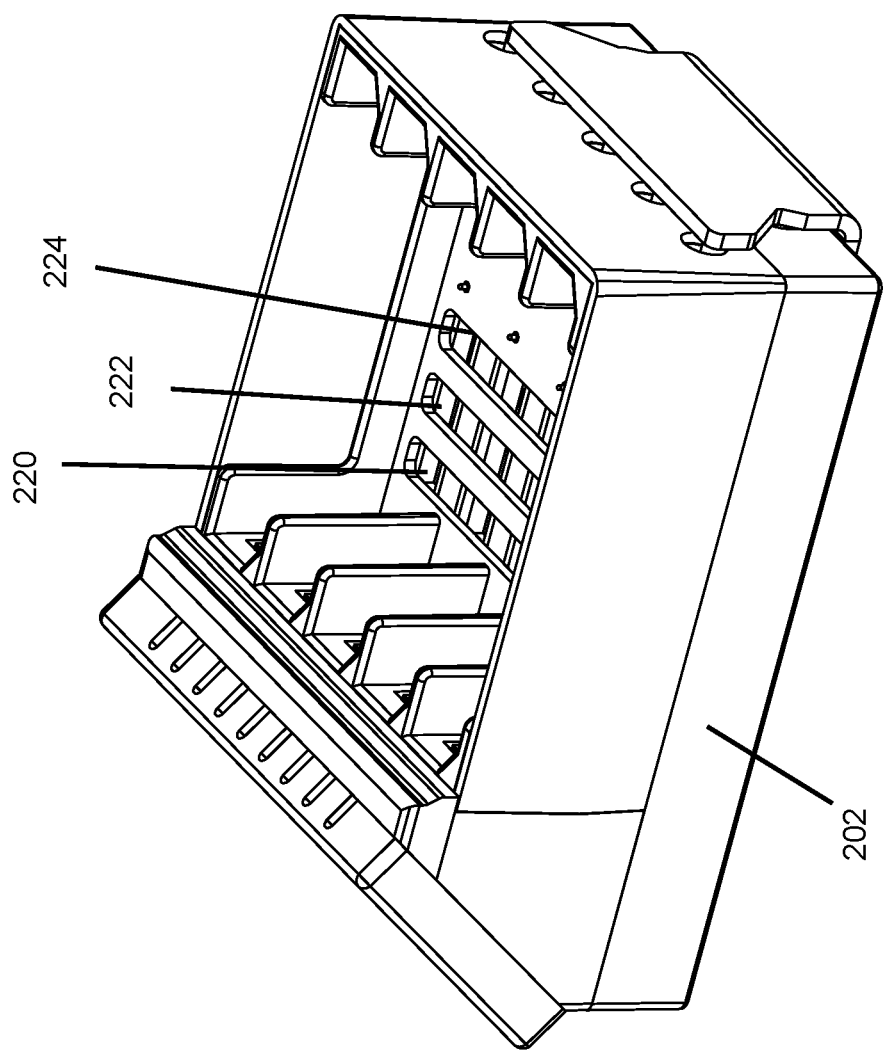
FIG. 15 is a right side perspective view thereof.

Housing 202 provides drains 220, 222, 224 within the base of the housing as shown in FIG. 15. Blowers 212, 214, 216, 218 blow the liquid and debris within the base of the housing 202 to the drains 220, 222, 224. The liquid and debris exit the base of the housing 202 at the drains 220, 222, 224. Removing the liquid and debris from the base reduces the amount of liquid and debris in which the devices may be stored. The drains 220, 222, 224 extend the life of the devices and the chargers by reducing the exposure of the devices and chargers to liquids and other debris.

As discussed above, the charging system charges the devices. The port of the device, such as devices 103, 116, 118, 120 is usually located at the bottom of the device. The charging adapter and charging contacts of such a device would also be located at the bottom of the device 103, 116, 118, 120. To complete the circuit, the charging contacts 178, 180 of the chargers protrude forward towards the storage aperture from the rear of the housing. The blocking head of the device would be located at the top of the device housing to prevent insertion of the top of the device housing past a certain distance within the storage apertures. The blocking head of one embodiment allows full insertion of the device within the housing as shown in FIGS. 8 and 9.

In one embodiment, an identification system of the housing communicates with the device to determine the device identifier of the device inserted into the housing. A port of the device provides different pins capable of different functions such as charging the battery and transferring data. At least one of these pins, a communication pin, provides a communication path between the device and the data contacts 176, 182. In one embodiment, the charging adapter serves as the communication system capable of identifying the device. The charging adapter of one embodiment provides contacts, such as a data contact, that communicates with the mobile device through the communication pin of the device. The data contact of the charging adapter contacts the communication pin of the mobile device. The communication system of one embodiment is implemented through the data contacts.

The data contacts of the device contact the data contacts 176, 182 within the housing to transfer an electric signal between the device and the charger. The device data contacts of one embodiment connect to a port of the device. The data contacts contact a pin of the port to transfer data between the device and the charger. In one embodiment, the data contacts of the electronic device are formed as part of the device. In another embodiment, the data contacts of the device are implemented on the charging adapter similar to the charging contacts described above.

A port of the device provides different pins capable of different functions such as charging the battery and transferring data. At least one of these pins, a communication pin, provides a communication path between the device and the housing. In one embodiment, the charger serves as the communication system capable of identifying the device. The charger of one embodiment provides contacts, such as data contacts that communicate with the mobile device through the communication pins of the device. The data contacts of the charger contact the communication pin of the mobile device. The communication system of one embodiment is implemented through the data contact.

The chargers of one embodiment communicate with the mobile devices through data contacts of the charger and the communication pin of the device. The charger receives identification data from the device. The charger determines the identification of the device. The server then instructs which devices to charge and which devices to release to specified users. Another embodiment enables wireless communication with the controller and server.

The server and storage system of one embodiment communicate with the electronic devices via data contacts 176, 182, such as identification contacts. The server receives identification data from the storage and charging system. The server determines the identification of the device via the data contacts 176, 182. The server may also acquire status updates and other data from the electronic devices via the data contacts 176, 182. The server then instructs which devices to charge and which devices to release to specified users.

The charging contacts and orientations have been shown in one manner as shown. The placement of the charging contacts may vary according to the placement of the charging contacts on the device, orientation of the insertion aperture, and the travel path of the electronic devices through the housing to the release aperture. The charging station may be configured to accept the electronic device in other orientations that will allow for charging of the device.

The charging station, such as the housing, may also serve as storage of the devices. The devices may be placed into the charging station and then locked within the charging station. Locking the devices in the charging station prevents unauthorized access and securely stores the devices within the charging station.

The charging station may also be implemented as a mobile charging station. Wheels may be attached to the charging station to assist with transporting the devices and the charging station. The wheels increase the mobility of the charging station. A handle may also be attached to the charging station for maneuvering the charging station.

The charging and storage system communicates with a server, such as a computer, to identify whether a device should be released from the housing. The charging and storage system and server may communicate wirelessly or through a wired connection. Such communication may also occur across a network or across the Internet. A wireless communication device, including but not limited to NFC, WIFI, Bluetooth, and other wireless devices, may be provided with the housing to allow wireless communication with the server.

Access to the device secured within the housing may be granted upon certain conditions and/or rules as discussed in U.S. Pat. Nos. 9,917,455; 10,225,734; 10,256,645; and 10,678,302. The system tracks usage of the devices and the status of the user. Such status of the user may be based upon the user's behavior, the user's prior usage of the device, and the user's position in the hierarchy of accessing a device. The server identifies which users should be granted access to the device. The server assigns a device to a user. The server transmits a message to the housing identifying the device to be unlocked for the user. The server maintains a log of the devices that have been accessed by the users.

To release a device from the base, a user must enter a proper authorization code as shown in U.S. Pat. Nos. 9,917, 455; 10,225,734; 10,256,645; and 10,678,302. The secured storage grants access to the user who provides the proper credentials and identification. The system includes a server, such as a computer or other computing device, in communication with the charging and storage system. The system requests authorization from the user to access the device from secured storage. The user enters the user's identification and/or password to receive the device. The server authenticates the user's identification via such authentication methods which include, but are not limited to, password, PIN number, fingerprint, voice recognition, retinal scan, facial recognition, biometrics, or other authentication methods.

The server determines whether a proper identification has been entered. The server determines whether a proper user has attempted to access a secure device. If the credential check fails, the system denies the user access to a device. In one embodiment, the system may lock the user out by limiting the number of tries a user can attempt to access the device. The system may require the user to wait a specific amount of time before allowing the user to attempt unlocking the device.

If the user enters a proper identification, the server then determines whether the user should be allowed access to the device. The server checks the user and compares the user's identification against a set of rules or other criteria to determine if the system should allow the user access to a device. In one embodiment, the system compares the user's identification to an authorized list of users allowed access to the devices. The system defines rules determining whether to grant the user with access to a device. Such rules can include whether the device belongs to the user or whether the user should be granted access to a device.

The rules can include whether the device is sufficiently charged or in otherwise proper operating condition. The rules can define a minimum charge of the device. If the device is not charged to the minimum charge, the system denies access to the device. Such a charge may be based on the battery power of the device.

The rules may also be based upon rules or guidelines set forth by an institution, a school, a library, a prison, a jail, a detention center, a learning center, a business, a place of learning, or a place of confinement. The system may allow access to the device to users with good behavior, users who have time remaining to access a device, users who have not abused the devices, users who have not damaged devices, users who have not lost or stolen devices, users who have returned devices, or users who have not otherwise abused the system. The system may prevent access to the devices to those users who have poor behavior, users who have no remaining access time for a device, users who have abused the devices, users who have lost or stolen devices, users who have not returned devices, or users who have otherwise abused the system. The system may also deny access to the devices if insufficient devices remain and a user placed higher in the hierarchy is also attempting to access a device.

The system may deny access if a user has exceeded an available access limit. The system defines a set amount of time for which the user can access the device. The system tracks the amount of time a user has accessed the device from the housing. If the user exceeds the available access limit, the server denies access to the device. The server confirms that the user has available access time remaining before releasing the device to the user.

The system may also restrict access to certain time periods. If a user attempts to access a device outside of the available access time, the system denies access to the device. The system will allow access to the devices if the user accesses the device during the available access times.

One embodiment of the present invention provides devices with specific features or limited capabilities. These devices are assigned a specific class. The system grants access to users to devices of a specific class. These classed devices may be restricted for access by only a few users, granted greater access to allow an increased number of users to access devices of the class, or provided for free or low cost. Such classes may be a library class device or communication class device. The server communicates with the housing to identify which devices of a particular class that the user may access. The server identifies the user to determine the type of user. The type of user can access devices of a particular class or classes. The server identifies which classes the user may access and grants the appropriate access. The server instructs the housing to release a device to which the user has proper access.

The library class may be provided for an inmate law library. Such a library class may be restricted to only a set of users such that users outside of that set cannot access devices in the library class.

The communication class provides a number of devices that are restricted to a more restricted set of inmates. Users outside of the communication class cannot access the devices in the communication class.

During a rule check, the system determines whether the user is approved to access a device. If the rules indicate that a user should not be allowed access, the system denies the user access to a device. The system then requests authorization from a different user. As discussed above, the system may require the user to wait a specific amount of time before allowing the user to attempt unlocking the device.

The server of one embodiment implements the rules. If the server restricts a user from accessing a device, the server instructs the locks not to release the device. The server sends the message to the locks. In one embodiment, the server communicates directly with the chargers and the locks. In another embodiment, the server communicates with the chargers and the locks via the controller. The locks then refuse access to the device by not releasing the device.

If the user is allowed access, the system sends a message to the lock indicating that the user is granted access to a device. The message includes an authorization for the user to access a device. In one embodiment, the message identifies a device that is assigned to the user. The message may include the identification of the charger and the location at which the assigned device is stored. The lock may then release the assigned device.

The housing then sends the system a message indicating that the housing has received the message from the system. The message includes confirmation receipt of the message from the server. The message also includes confirmation that the lock releases the assigned device.

The server receives the message from the charging system. The server confirms the authenticity of the message from the charging system. The server also confirms that the authentic message is the complete message from the housing. The server logs release information concerning the unlocked device. The information includes the user who accessed the device, the device ID assigned to the user, and the time that the device was released from the housing. Such information allows administrators, staff, or others to identify which devices have been released. The server logs the identification of device and the identification of the user who accessed the device from the housing. Such information enables the system to account for which users last accessed a particular device. The institution may then hold users accountable for devices accessed by the users.

The charging system releases a device for access by the user. The charging system receives an unlock message from the server. The charging system confirms the authenticity of the message from the server. The charging system also confirms that the message from the server is complete. If the charging system confirms that the message from the server is complete and authentic, the lock releases the device.

The charging system releases the device identified by the server. In another embodiment, the charging system may assign the device to be released and transmits the device identifier associated with the device so that the server can log the device identifier and the user who accessed the device.

The charging system of one embodiment restricts access of the device to authorized users and charges the device. The charging unit provides charging apertures for receiving the mobile devices and positions the devices at the chargers. The charging unit keys the devices for proper insertion of the devices into the charging unit. The charging unit also orients the devices for charging on the chargers and for transferring data with the server.

The charging system controls each charger individually to allow selective charging of individual devices. For example, the server may determine that some devices should charge, and other devices should not charge. The charging system activates the chargers associated with the devices to be charged. The housing does not activate the chargers associated with the devices not to be charged.

The devices communicate with the server and charging system for identification, updates, upgrades, and other modifications as discussed below. The charging system via the data contacts 176, 182 can update, upgrade, or otherwise modify devices inserted into the housing. The charging system can identify the device identifiers of the devices that are inserted within the housing and located at the data contacts 176, 182 of the chargers. The housing can communicate with each other and the server to identify the location of the devices and the devices inserted into each housing. The server can then control charging of the different devices, cease charging through a designated base, etc. The housings may be placed in different areas of the facility. The server can then specify the different chargers to charge the devices based upon the location of the housing.

The housings identify the different devices inserted within each housing. The housings report the devices within each housing to the server. With such information, the server generates reports identifying the location of the devices, the user identifier of the user who accessed the device, the time of accessing the device, the time of returning the device, and the condition of the device.

Each housing identifies the mobile device inserted into the housing during insertion of the device. The housing identifies the electronic device via a unique device identifier associated with each device. Such device identifiers include but are not limited to a visual indicator, such as a barcode or other visually detected identifier, or an electronic identifier assigned to the device that is accessed from the device. An identification system detects the device identifiers to determine the identification of the device. The identification system may determine the device identifier via a visual identification device, an electronic identification device, a reader, a communication system between the housing and the device, or other detection system that can determine the device identifiers.

The electronic device exchanges identification data with the charging system. Such identification may be detected by the charging system with a visual identification device, including but not limited to a camera, a bar code reader reading a bar code or other identifier on the device, or other visual ID reader. Such visual identification device may be installed within the housing.

In one embodiment, the device exchanges the identification data with the charging system through a communication system. The identification data transfers through a communication system, such as a wireless connection, a wired connection, Bluetooth communication, ultrasonic, light, light pulses, or a contact such as the charging contact or data contact. Other data may also be exchanged through such a communication system. Such data may include software upgrades, configuration profiles, charging profiles, updates, upgrades, and other data.

Upon identifying the device, the housing communicates with a server. In one embodiment, the housing communicates with the server via the controller. The housing submits the identification data of the device, such as the device identifier, to the server. The housing of one embodiment of the present invention also identifies the housing identifier associated with the housing and the charger at which the device is currently charging.

The server may then maintain records of each device that is placed within the housing and the charger at which the device is located. The charging system then controls charging of the device via the charging contacts 178, 180. Such a housing enables controlled charging of the device even if the device is not connected via the network.

Upon placement of the device at a charger, the housing transmits a charge request to the server to determine if the charger should charge the device. The charge request provides sufficient information to the server to identify the housing at which the device is installed, the identifier of the device, and the identifier of the charger that will be charging the device.

In one embodiment, the housing updates the mobile computing devices that have been inserted into the housing. The device may not always be connected to a network to receive updates. Updating the computing device via the housing avoids issues related to being disconnected from the network. The housing receives the updates from the server. The communication system transfers data between the housing and the device. As discussed above, the communication system transfers data through a physical connection, a wired connection, or a wireless connection.

The data contacts update the device when the device is inserted into the housing and located at the charge position with the data contacts. The housing may receive software upgrades, configuration messages that update configuration profiles for the devices, messages that update the charging profile, and other upgrades, updates, and/or modifications for the devices. The communication system transfers the data from the housing to the device. The device may then communicate with the housing to indicate that the device has been properly updated and/or modified. The housing may then inform the server of the update and/or modification. One embodiment of the server updates the devices based upon the identity of the device and/or predefined rules.

In one embodiment, the housing and chargers selectively charge devices. The server instructs the housing to charge specific devices. The housing determines the identification of each device inserted into the housing as discussed above.

The server determines the identification of the devices. The server receives identification information from the devices sufficient to determine the location of the device, the device identifier, the charger at which the device is located, and the charging contacts that will charge the device.

After the server receives the identification information with the charge request, such as the housing identifier, the device identifier, the charger identifier, and the charging contacts that will charge the device, the central server compares the secure charge request against charging rules which apply to the specific mobile electronic device. The rules may vary according to the needs of the controlled environment or facility. In one embodiment, the rules are stored within a database. The rules may be stored locally or remotely within storage. If the rules are met, the central server instructs the secure charger to charge the device.

Once the secure charger receives authorization from the central server, the charger activates to charge the mobile device. Electricity flows through the charging conductors between the secure charger and the mobile electronic device for charging the mobile electronic device's battery.

Controlling the charging of the devices enables administrators to control usage of the devices that may not be connected to a network. Administrators may selectively charge devices to control usage of the devices. Without a charge, users cannot use or misuse the devices. Administrators simply stop charging selected devices to limit use of the device. If the unauthorized devices cannot be charged, usage of the unauthorized devices will eventually cease.

The server may impose rules before charging the device. Such charging rules consider the status of the device, the status of the facility, the environmental status, the user's usage of the device, and other conditions.

The server and/or the charging system may determine that a device has been damaged or otherwise tampered with. If such a device has been damaged or tampered with, the server instructs the housing not to charge such a device. The housing may identify damaged devices based upon a visual inspection via the camera.

The housing may also identify damaged and/or tampered devices by identifying devices that no longer properly fit within the housing. Such proper fit may be determined by the ability to insert the electronic device onto the conveyor system. If the device does not properly insert into the housing, the device has been tampered with or damaged. The housing will not charge such a device.

Other rules may be directed to the facility status. Such rules may require proper operation conditions to be in place to allow charging. The housing may prevent charging of the devices in riot situations, emergency situations, lock downs, or other unsafe conditions. During such situations, the server transmits a facility cease charging command that disables the housings' charging capabilities. The administrators may override the facility cease charging command. The housings may be installed in different areas such that the cease charging commands can disable only the housings within a designated area. The cease charging command may be sent to only those bases in the defined zone to be disabled.

Other charging rules implemented by the server include battery condition rules. Such battery condition rules include stop charging if the temperature within the housing is above a designated temperature, such as 113° F. Avoiding charging at such temperatures prolongs battery life of the device. The housing transmits the temperature at the housing to the server for the server to implement the charging rules.

The battery condition rules may also enable or disable charging based upon the charging profile of the battery. If the charger determines an improper charging profile of the battery, the housing may slow charging or disable charging of the device. In most instances, the housing will slow charging to prolong battery life.

The charger may also determine if a battery is not sufficiently charged. In some instances, a device may be returned to the charger with insufficient charge for operation of the device. The charger will then charge the device with enough electricity to identify the device. If an acceptable device identifier is not determined by the time a sufficient charge is acquired by the device or by a predetermined time, the charger will no longer charge the device. Such a charging system eliminates charging of unauthorized devices.

In some embodiments, an administrator inputs charging rules into a central server database using a web form, specifying a rule defining what devices are allowed to charge, the times charging is allowed, and which users the system allows release of devices from the housing. Upon request by the secure charger, the central server uses the predefined rules setup by the administrator to determine whether the mobile electronic device should be charged while connected to the secure charger. In this embodiment, the central server also authenticates end users requesting the release of a mobile electronic device locked in the secure charger and determines whether to release the mobile electronic device based on the rules established by the administrator.

The server determines that the rules are met to enable charging of the device. The housing charges the device until the device is ready for use. After the device is sufficiently charged, the device enters the rotation to be checked out to authorized users. An authorized user may then check out the device if the server and housing authorize the user's use of the device.

The present invention also provides a billing system for billing the usage of the devices. The billing system bills the user and the user accounts associated with the users. The user checks out the device from the housing. The server associates the user with the device to identify the user who has checked out the device for usage. The server logs the usage of the device by the user. Such logging may include a user identifier, a device identifier, and a time and date that the device was released to the user. The server may also log the condition of the device at the time that the device was released to the user. The server may also log the charge percentage of the battery of the device at the time the device is released to the user.

The user must then return the device to a housing. The system will also log the return of the device. The system will log the condition of the device, the charge percentage of the battery of the device, and the date and time that the device is returned.

The system then bills the user for the usage of the device. The system may bill based upon the time for which the device was released to the user. Such billing may be based upon the time that the user had the device. The system may also allow for a free period of time. The system grants access the user with access to the device for a limited time without charge. If the user exceeds the free time, the system allows continued access to the device with for a fee. The system bills the user/user account for the continued use of the device.

Such billing may be based upon the class of the device that the user accesses. Some classes of device may be provided at no charge or at a reduced rate. Other classes of devices may be provided to the user at an increased rate. For example, library class devices may be provided at no charge or billed at a lower rate. Devices in the entertainment class may be billed at a higher rate due to the increased features.

Another embodiment may bill the user based upon the power consumption of the device. The system determines the amount the battery has drained while the device is released to the user. The system may also bill upon the amount of electricity required for the device to be charged to the percentage at which the device was released to the user.

The system may also bill the user each time the user checks a device out from the housing. Upon removing the device from the base, the housing instructs the server that the device has been released a specific user. The billing system then bills the user/user's account for usage of the device due to the release of the device. In another embodiment, the user is billed upon the removal and return of the device to the housing.

The system also generates alerts based upon predefined rules. The rules of one embodiment generates alerts based upon predefined rules stored in the server. Such rules generate an alert based upon:
  a) Detection of the device not fully inserting into the housing and/or the conveyor system;
  b) Detection of a damaged device;
  c) Detection of a device that has been tampered with;
  d) Detection of a device with no power;
  e) Detection of a device that requires a software upgrade;
  f) Detection of a device requiring an updated configuration profile;
  g) Detection of a device with an inadequate charging profile;
  h) Detection of temperature exceeding a predetermined temperature;
  i) Detection of removal of a device without authorization;
  j) Detection that a device has not been removed from the housing within a predefined time period;
  k) Detection that a device has not been returned to a housing within a predefined time period; and
  l) Detection of an unauthorized device.

The system may generate an alert that is transmitted to the server. The server may then alert personnel of the alert condition that triggered the alert. Such an alert may be a message sent to a cell phone, a computer, a pager, or an audible alarm.

Another embodiment of the present invention provides an audible alarm. The alarm may be installed within a housing or within the facility. The alarm of one embodiment activates if a device is removed without authorization. The alarm alerts the personnel that a device is removed without authorization. In another embodiment, the alarm may activate upon detection of the alert conditions identified above. The system indicates which condition triggered the audible alarm.

One issue in correctional facilities is that inmates tend to be possessive of a particular device. The inmate may intimidate, harass, threaten, or otherwise harm another person for using such a device. For this reason, a device may remain within a housing. The server identifies mobile devices that have not been removed from the housing for a predetermined amount of time. Such identification alerts the administration that a particular device has been claimed by an inmate such that no one will use the device. The facility may then remedy the situation by pulling the device from rotation or moving the device to an area not accessible the inmate claiming ownership.

The server also identifies the mobile electronic devices that have not been returned to the housing within a predefined time period. The server alerts the administration that a mobile device has not been returned to the housing within the time period. Because the server can communicate with multiple housings, the server can check the status of the devices within all of the housings of the facility. The server of one embodiment generates an alert or an alarm to indicate that the device has not been returned.

In one embodiment, the system deactivates a device that has not been returned to the housing within the predefined time period. The server instructs the device to deactivate. The server of one embodiment denies the device access to the network. In another embodiment, the server sends the instruction to deactivate directly to the device. The device then deactivates until the administrator reactivates the device.

In one embodiment of the present invention, the server can identify the number of devices within the housing(s) of the facility. The server can take an inventory to determine if any devices are not installed within the housing(s). The server can then instruct the housing(s) to lock all devices within the housing(s) until all of the devices are accounted for by being returned to the housing(s). In one embodiment, the server requires a predefined number of devices to be inserted into the housings before unlocking any of the devices from the housings. The server instructs the housings to prevent access to the devices. The housings then do not release any devices. The system will allow an administrative override to allow administrators access to devices within the housings.

The housing of one embodiment provides data contacts of the chargers. The data contacts communicate with data contacts of the electronic device. The housing data contact and the device data contact transfer information between the device and the housing. Such data transfer between the housing and the device provides additional control of the devices.

The chargers of one embodiment identify the device identifier associated with each device via the data contacts. Administrators can also update the devices as needed. The housing transfers the data needed to update the device to the device via the device contacts.

Another embodiment of the present invention provides a sanitizing system installed within the housing. The sanitizing system sanitizes, cleans, and/or disinfects the electronic devices. In one embodiment, the sanitizing system cleans the electronic device prior to releasing the device to an authenticated user. The sanitizing system may be implemented on the rules based system described above that applies rules to determine if the device should be released to the authenticated user.

The sanitizing system provides a sanitizer such as a spray unit with nozzles, UV light, or other sanitizer. The spray unit disperses a sanitizing spray, such as a liquid or gel, on the electronic device. The nozzles spray the sanitizing spray on the electronic device.

The sanitizing spray is stored within a reservoir. A pump sprays the sanitizing spray through the nozzles of spray unit onto the electronic devices. Reservoir may supply the spray to each unit or a single unit. Pump is powered by a power source.

Another embodiment may include a brush that contacts the electronic devices to brush the electronic devices. Pump sprays the sanitizing spray through the brush. The brush of one embodiment may include a wick that supplies the sanitizing spray to the brush. In one embodiment, a brush is installed within each charging aperture between which the electronic devices are placed. The brush applies the sanitizing spray to the electronic device and brushes the spray across the device. Reservoir may supply the spray to each brush or a single brush. Pump is powered by a power source.

Another embodiment of the present invention may provide lights, such as UV lights that sanitize the electronic device. Each light is associated with a charging aperture. The lights are oriented to align with the charging aperture with insertion of the electronic device. The lights may be ultraviolet lights or other lights that disinfect the electronic device. Applying the light for a particular amount of time disinfects and/or sanitizes the electronic device.

The server may control the sanitizing system. The server may track sanitation of each device. In another embodiment, the housing controls the sanitizing system. The system of one embodiment maintains records indicating that devices have been sanitized and the time of sanitizing the devices. In one embodiment, the system activates an alert if the light or spray system is not functioning due to power failure, bad pump, no sanitizing spray, or non-functioning light. The server may maintain records of when the devices 103, 116, 118, 120 were sanitized. The server may also activate an alert for when the sanitizing systems are not functioning properly.

The sanitizing systems may sanitize all charging apertures or may only sanitize those charging apertures occupied by a device. The sanitizing system tracks the device identifier and sanitization records to confirm the sanitation of the devices.

The rules logic system, such as the server, of one embodiment may require sanitation of the device before releasing the device. The system may lock the device until the device has been sanitized. The system may sanitize the device and release the device or release another device that has been sanitized to the user.

The present invention has been described as charging and transferring data through a physical contact with charging contacts and data contacts. The present invention also provides for wireless charging of the devices and wireless transfer of data between the server and the devices.

The present invention has been described as providing bases, supports, and support arms that angle downwards such that the bases, supports, and support arms are not level. One embodiment may provide for level bases, supports, and support arms that enable drainage of fluids away from devices stored on supports and support arms. The drainage space between and underneath the supports and support arms reduces the fluids at or near the devices. Another embodiment may provide level supports and support arms and an angled base that is not level. Another embodiment may provide a level base with angled support arms and supports that are not level.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A charging system for storing and charging an electronic device to limit contact of the electronic device with liquid, wherein the system releases the electronic device to an authenticated user, the system comprising:
a housing that accepts insertion of the electronic device into an opening;
a storage aperture of the housing extending longitudinally into the housing from the opening, wherein the storage aperture accepts insertion of the electronic device into the housing;
a charger within the housing that charges the electronic device;
a first support arm and a second support arm extending longitudinally below the opening into the storage aperture, wherein the first support arm and the second support arm receive the electronic device to support the electronic device upwards;
a base of the storage aperture, wherein the base is positioned below the first support arm and the second support arm, wherein the base is not level;
a first longitudinal end of the base located longitudinally near the opening;
a second longitudinal end of the base located longitudinally away from the opening, wherein the second longitudinal end of the base is located vertically below the first longitudinal end;
wherein the charger is located vertically above the first support arm, the second support arm, and the base;
wherein the first support arm and the second support arm support the electronic device upwards towards the charger and above the base; and
a drainage space located below the support arms, wherein the support arms support the electronic device above the drainage space, wherein the drainage space is located vertically between the base and the support arms, wherein the base is configured to catch the liquid and direct the liquid off the second longitudinal end.

2. The system of claim 1, wherein the support arms angle downwards longitudinally downward from the opening to store the electronic device not level, wherein the support arms are not level;
wherein the base angles downward to direct the liquid off the base at the second longitudinal end, wherein the base provides no drain apertures to limit liquid flowing vertically through the base.

3. The system of claim of 1 further comprising:
a charging unit, wherein the charger, the base, and the support arms are secured to the charging unit, the charging unit secured within the housing, wherein removal of the charging unit from the housing removes the charger, the base, and the support arms as a unitary component.

4. The system of claim 3 further comprising:
a top of the charging unit;
a bottom of the charging unit;
wherein the charger, the base, and the support arms are located vertically between the top and the bottom of the charging unit;
wherein an internal component of the housing is located vertically above the top of the charging unit, wherein the top shields the internal component.

5. The system of claim 3 further comprising:
a top of the charging unit;
a bottom of the charging unit;
wherein the charger, the base, and the support arms are located vertically between the top and the bottom of the charging unit;
wherein an internal component of the housing is located vertically below the bottom of the charging unit, wherein the bottom shields the internal component.

6. The system of claim 2 further comprising:
wherein an internal component of the housing is located vertically below the base, wherein the base shields the internal component;
a shield located within the housing, wherein the shield covers the internal component, wherein the base extends longitudinally past a portion of the shield, wherein the base extends longitudinally above the shield, wherein the base angles downwards towards the shield.

7. A charging system for storing and charging an electronic device to limit contact of the electronic device with liquid, wherein the system releases the electronic device to an authenticated user, the system comprising:
a housing that accepts insertion of the electronic device into an opening;
a storage aperture of the housing extending longitudinally into the housing from the opening, wherein the storage aperture accepts insertion of the electronic device longitudinally into the housing;
a charger within the housing that charges the electronic device, wherein the charger is located longitudinally away from the opening;
a first support arm and a second support arm upon which the electronic device rests, wherein the charger charges the electronic device while the electronic device is supported upwards by the support arms;
a base of the storage aperture, wherein the base is located below the first support arm and the second support arm, wherein the base angles downward longitudinally from below the opening into the housing, wherein the base is not level;
wherein the charger is located vertically above the base and the support arms; and
a drainage space located below the support arms, wherein the drainage space extends between the support arms, wherein the support arms support the electronic device above the drainage space and the base, wherein the drainage space is located vertically between the base and the support arms.

8. The system of claim 7 further comprising:
a charging unit attachable to the housing, wherein the charger, the support arms, and the base are secured to the charging unit, the charging unit secured within the housing, wherein removal of the charging unit from the housing removes the charger, the support arms, and the base as a unitary component.

9. The system of claim 7 further comprising:
a first longitudinal end of the base located longitudinally near the opening;
a second longitudinal end of the base located longitudinally away from the opening, wherein the second longitudinal end of the base is located vertically below the first longitudinal end;
wherein the base angles downward from the opening;

wherein the base provides no drain apertures to limit liquid flowing vertically through the base to direct the liquid off the base at the second longitudinal end; and wherein the support arms angle downwards from the opening to support the electronic device unlevel.

10. The system of claim 7, wherein the support arms remain fixed in position to support the electronic device upwards towards the charger and above the base and the drainage space.

\* \* \* \* \*